United States Patent [19]

Aramaki

[11] Patent Number: 5,485,457
[45] Date of Patent: * Jan. 16, 1996

[54] PACKET SWITCHING SYSTEM CAPABLE OF REDUCING A DELAY TIME FOR EACH PACKET

[75] Inventor: Toshiya Aramaki, Tokyo, Japan

[73] Assignee: NEC Corporation, Tokyo, Japan

[*] Notice: The portion of the term of this patent subsequent to Oct. 12, 2010, has been disclaimed.

[21] Appl. No.: 319,039

[22] Filed: Oct. 6, 1994

Related U.S. Application Data

[63] Continuation of Ser. No. 968,507, Oct. 29, 1992, Pat. No. 5,383,181.

[30] Foreign Application Priority Data

Oct. 31, 1991 [JP] Japan ................................ 3-286033
Nov. 29, 1991 [JP] Japan ................................ 3-315845

[51] Int. Cl.$^6$ ................................................ H04L 12/56
[52] U.S. Cl. ................................ 370/60; 370/94.1; 370/61
[58] Field of Search .............................. 370/58.1, 58.2, 370/58.3, 60, 60.1, 61, 94.1, 94.2; 340/826, 825.8

[56] References Cited

U.S. PATENT DOCUMENTS 4,894,823  1/1990  Adelmann et al. ................... 370/60
5,127,000  6/1992  Henrion ............................... 370/60
5,202,885  4/1993  Schrodi et al. ....................... 370/94.1
5,253,251  10/1993  Aramaki ............................. 370/60

Primary Examiner—Douglas W. Olms
Assistant Examiner—Russell W. Blum
Attorney, Agent, or Firm—Sughrue, Mion, Zinn, Macpeak & Seas

[57] ABSTRACT

In a packet switching system having input ports (20-1-1 to 20-8-8) supplied with input packets and output ports (21-1-1 to 21-8-8) producing output packets, each of time stampers (22-1-1 to 22-8-8) connected to the input ports assigns a time stamp to the input packet supplied thereto to produce a time stamped packet. Connected to the time stampers, each of primary switches (23-1 to 23-8) carries out a primary switching operation on the time stamped packets supplied thereto so as to connect input lines thereof and output lines thereof in one-to-one correspondence to produce primary switched packets. Connected to the primary switches in a cross link connection fashion, each of secondary switches (24-1 to 24-8) carries out a secondary switching operation on the primary switched packets on the basis of destination addresses thereof in sequence to produce secondary switched packets. Connected to the secondary switches in the cross link connection fashion, each of tertiary switches (25-1 to 25-8) corrects sequence of the secondary switched packets on the basis of the time stamps assigned thereto to produce sequence corrected packets and then carries out a tertiary switching operation on the sequence corrected packets on the basis of the destination addresses thereof to produce tertiary switched packets. Each output port produces each tertiary switched packet as each output port.

11 Claims, 18 Drawing Sheets

PACKET SWITCHING SYSTEM CAPABLE OF REDUCING A DELAY TIME FOR EACH PACKET

This is a continuation of Application No. 07/968,507, U.S. Pat. No. 5,383,181, filed Oct. 29, 1992.

BACKGROUND OF THE INVENTION

This invention relates to a packet switching system and, more particularly, to a mass packet switching system for use in transmitting and switching information at an ultra high speed.

Recently, attention has been directed to a high-speed packet switching system for use in converting into packets all types of information, such as voice, data, picture, or the like, and in transmitting and switching the packets at ultra high speed by using a simplified protocol. For such high-speed packet switching, a large scale packet switching system accommodating hundreds of lines or more is realized by connecting many small or medium scale packet switches in a multistage fashion.

Such a large scale packet switching system is, for example, described by Kentaro Hayashi et al in a paper submitted to "1989-nen Densi Tûsin Gakkai Kôkan Kenkyukai (1989 A Society for the study of Switching in the Institute of Electronics and Electrical Communication Engineers of Japan)" as Paper No. SSE89-173, pages 61–66, under the title of "A Study on Control Algorithm for Large Scale ATM Switch" according to contributors' translation. The packet switching system is composed of a 3-stage switch network or comprises first through third stage switches. The packet switching system has $N^2$ input ports and $N^2$ output ports, where N represents a predetermined number which is not less than two. Each of the input ports is supplied with an input packet having a fixed length. Such an input packet may, for example, be an ATM (asynchronous transfer mode) cell. The first stage switch is connected via $N^2$ time stampers to the input ports and comprises first through N-th distributing switches. The second stage switch is connected to the first stage switch in a cross link connection fashion and comprises first through N-th primary routing switches. The second stage switch is connected to the third stage switch in the cross link connection fashion and comprises first through N-th secondary routing switches. The third stage switch is connected via $N^2$ packet sequence correctors to the output ports.

Each of the time stampers assigns a time stamp indicative of a time instant to the input packet supplied thereto to produce a time stamped packet. Each of the first through the N-th distributing switches connects input lines thereof with output lines thereof in one-to-one correspondence irrespective of destination indicated by destination addresses of the time stamped packets supplied thereto. Each of the first through the N-th distributing switches produces distributed packets. Each of the first through the N-th primary routing switches carries out a primary routing switching operation on the distributed packets supplied thereto on the basis of the destination addresses included in the respective distributed packets to produce primary routing switched packets. Each of the first through the N-th secondary routing switches carries out a secondary routing switching operation on the primary routing switched packets supplied thereto on the basis of the destination addresses included in the respective primary routing switched packets to produce secondary routing switched packets. Each of the packet sequence corrector corrects sequence of the secondary routing switched packets successively supplied thereto on the basis of the time stamps assigned to the respective secondary routing switched packets to successively produce sequence corrected packets. The sequence corrected packets are produced via the output ports as output packets.

Each packet sequence corrector comprises a packet distributor, a control circuit, packet buffers, a sorter with a surviving function, and a packet line concentrator. The packet distributor distributes the secondary routing switched packets under the control of the control circuit to make the packet buffers which have no packet store the secondary routing switched packets as stored packets. When any packet in the stored packets is continuously stored in the packet buffers for a time duration longer than a predetermined time interval, the packet buffers deliver all of the stored packets to the sorter in response to the buffer control signal supplied from the control circuit. The sorter selects, as a selected packet, one of the stored packets that is assigned with the time stamp indicating the earliest time instant. The sorter delivers a selection control signal to a selected one of the packet buffers that stores the selected packet. Responsive to the selection control signal, the selected packet buffer sends the selected packet to the packet line concentrator. The packet line concentrator delivers the selected packet as the sequence corrected packet to the output port. The predetermined time interval is equal to the difference between the maximum delay time interval and the minimum delay time interval for which the input packet passes through the primary routing switch and the secondary routing switch.

At any rate, the packet sequence corrector carries out a packet sequence correction operation only when a packet is continuously stored in the packet buffers for a time duration longer than the predetermined time interval. Therefore, the packet is placed in the wait state although there is no reversal for sequence of the packets. As a result, the conventional packet switching system is defective in that it has the larger delay time for the packets. In addition, it is necessary for the packet sequence corrector to compare the time stamps assigned to all of the stored packets. Accordingly, the conventional packet switching system is disadvantageous in that it is complex to control.

SUMMARY OF THE INVENTION

It is therefore an object of this invention to provide a packet switching system which is capable of reducing a delay time for packets.

It is another object of this invention to provide a packet switching system of the type described, which is simple in control.

Other objects of this invention will become clear as the description proceeds.

On describing the gist of an aspect of this invention, it is possible to understand that a packet switching system is composed of a 3-stage switch network and has $N^2$ original input ports and $N^2$ original output ports, where N represents a predetermined integer which is not less than two. Each of the $N^2$ original input ports is supplied with an input packet having a fixed-length while each of the original output ports produces an output packet having the fixed-length. The input packet consists of a header and information bits. The header of the input packet includes a destination address indicative of destination for the input packet in question. The $N^2$ original input ports are divided into first through N-th input groups, each of which comprises first through N-th partial input ports. The $N^2$ original output ports are divided into first through N-th output.

According to the above-mentioned aspect of this invention, the above-understood packet switching system comprises $N^2$ original time stampers connected to the $N^2$ original input ports, respectively. Each of the original time stampers assigns a time stamp indicative of a time instant to the input packet supplied thereto to produce a time stamped packet. The $N^2$ original time stampers are divided into first through N-th stamper groups, each of which comprises first through N-th partial time stampers. The first through the N-th partial time stampers of an n-th stamper group are connected to the first through the N-th partial input ports of an n-th input group, respectively, where n represents an integer varying from one to N, both inclusive. First through N-th primary switches are connected to the first through the N-th stamper groups, respectively. Each of the first through the N-th primary switches has first through N-th primary input lines and first through N-th primary output lines. Each of the first through the N-th primary switches carries out a primary switching operation so as to connect the first through the N-th primary input lines with the first through the N-th primary output lines in one-to-one correspondence to produce primary switched packets. The first through the N-th primary input lines of an n-th primary switch are connected to the first through the N-th partial time stampers of the n-th stamper group, respectively. First through N-th secondary switches are connected to the first through the N-th primary switches in a cross link connection fashion. Each of the first through the N-th secondary switches has first through N-th secondary input lines and first through N-th secondary output lines. The first through the N-th secondary switches have n-th secondary input lines which are connected to the first through the N-th primary output lines of the n-th primary switch, respectively. Each of the first through the N-th secondary switches carries out a secondary switching operation on the primary switched packets supplied thereto in sequence on the basis of the destination addresses included in the respective primary switched packets to produce secondary switched packets. First through N-th tertiary switches are connected to the first through the N-th secondary switches in the cross link connection fashion. Each of the first through the N-th tertiary switches has first through N-th tertiary input lines and first through N-th tertiary output lines. The first through the N-th tertiary switches have n-th tertiary input lines which are connected to the first through the N-th secondary output lines of an n-th secondary switch, respectively. Each of the first through the N-th tertiary switches comprises a sequence correcting section for correcting sequence of the secondary switched packets successively supplied thereto on the basis of the time stamps assigned to the respective secondary switched packets to successively produce sequence corrected packets and a switching section for carrying out a tertiary switching operation on the sequence corrected switched packets on the basis of the destination addresses included in the respective sequence corrected packets to produce tertiary switched packets. The first through the N-th tertiary Switches are connected to the $N^2$ original output ports. The first through the N-th tertiary output lines of an n-th tertiary switch are connected to the first through the N-th partial output ports of the n-th output group, respectively, whereby each of the $N^2$ original output ports produces, as the output packet, the tertiary switched packet supplied thereto.

On describing the gist of a different aspect of this invention, it is possible to understand that a packet switching system is composed of a 3-stage switch network has first through N-th input ports and first through N-th output ports, where N represents a predetermined integer which is not less than two. Each of the first through the N-th input ports is supplied with an input packet having a fixed-length while the first through the N-th output ports produce first through N-th output packets, respectively, each having the fixed-length. Each of the input and the output packets consists of a header and information bits. The header of the input packet includes a destination address indicative of destination for the input packet in question.

According to the different aspect of this invention, the above-understood packet switching system comprises first through N-th time stampers connected to the first through N-th input ports, respectively. Each of the first through the N-th time stampers assigns a time stamp indicative of a time instant to the input packet to produce a time stamped packet. First through N-th primary switches are connected to the first through the N-th time stampers, respectively. Each of the first through the N-th primary switches has a primary input line and first through N-th primary output lines. Each of the first through the N-th primary switches carries out a primary switching operation on the time stamped packet supplied thereto so as to selectively connect the primary input line with the first through the N-th primary output lines to produce primary switched packets. First through N-th secondary switches are connected to the first through the N-th primary switches in a cross link connection fashion. Each of the first through the N-th secondary switches has first through N-th secondary input lines and first through N-th secondary output lines. The first through the N-th secondary switches have n-th secondary input lines which are connected to the first through the N-th primary output lines of an n-th primary switch, respectively, where n represents an integer varying between one and N, both inclusive. Each of the first through the N-th secondary switches carries out a secondary switching operation on the primary switched packets supplied thereto in sequence on the basis of the destination addresses included in the respective primary switched packets to produce secondary switching packets. First through N-th tertiary switches are connected to the first through the N-th secondary switches in the cross link connection fashion. Each of the first through the N-th tertiary switches has first through N-th tertiary input lines and a tertiary output line. The first through the N-th tertiary switches have n-th tertiary input lines which are connected to the first through the N-th secondary output lines of an n-th secondary switch, respectively. Each of the first through the N-th tertiary switches carries out a tertiary switching operation on the secondary switched packets successively supplied thereto on the basis of the time stamps assigned to the respective secondary switched packets. The first through the N-th tertiary switches produce first through N-th tertiary switched packets, respectively. The tertiary output lines of the first through the N-th tertiary switches are connected to the first through the N-th output ports, respectively, whereby the first through the N-th output ports produce, as the first through the N-th output packets, the first through the N-th tertiary switched packets, respectively.

BRIEF DESCRIPTION OF THE DRAWINGS

FIG. 1 is a block diagram of a conventional packet switching system;

DESCRIPTION OF THE PREFERRED EMBODIMENTS

Figure 2:
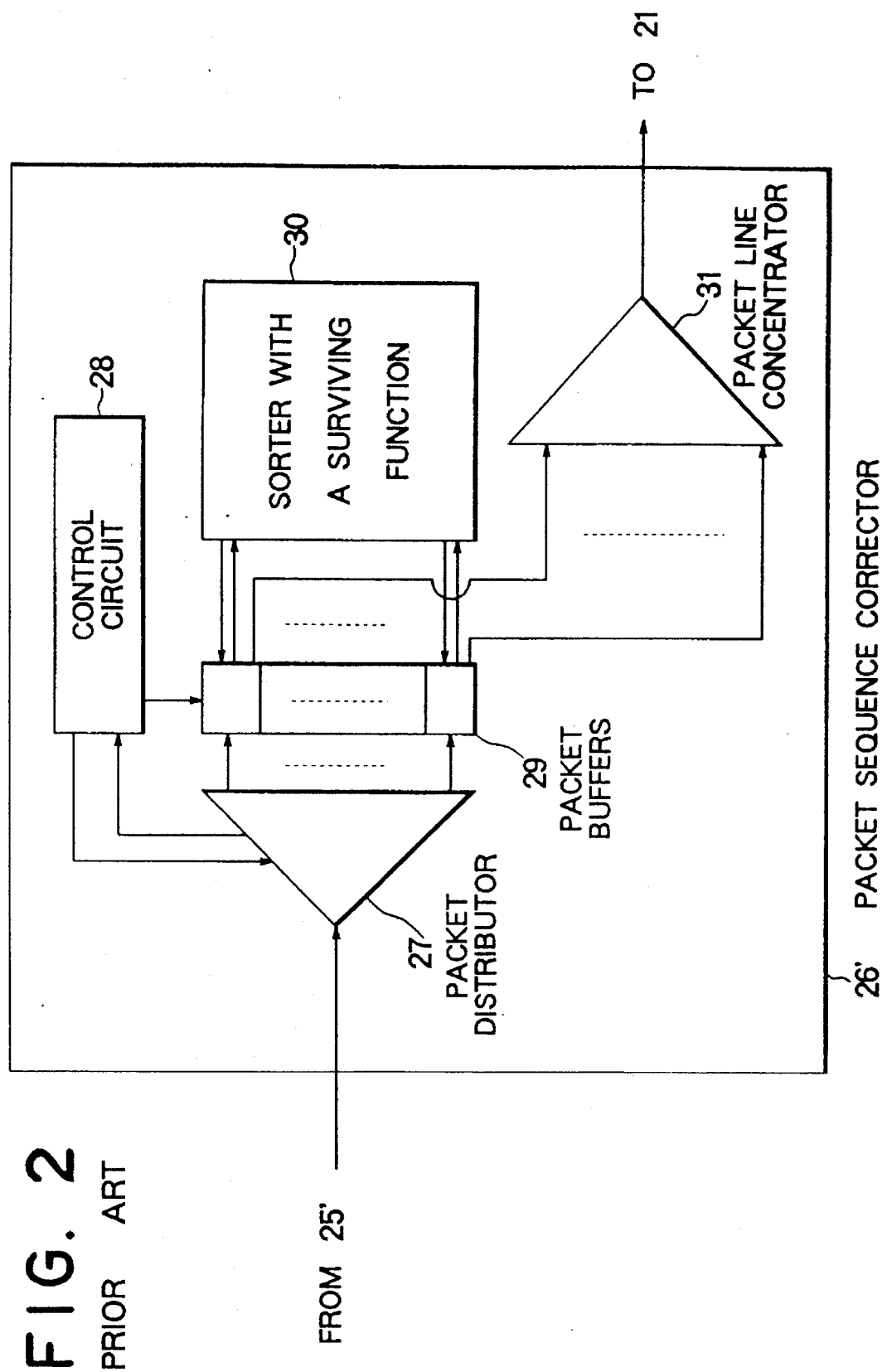
FIG. 2 is a packet sequence corrector for use in the packet switching system illustrated in FIG. 1.
Figure 2:
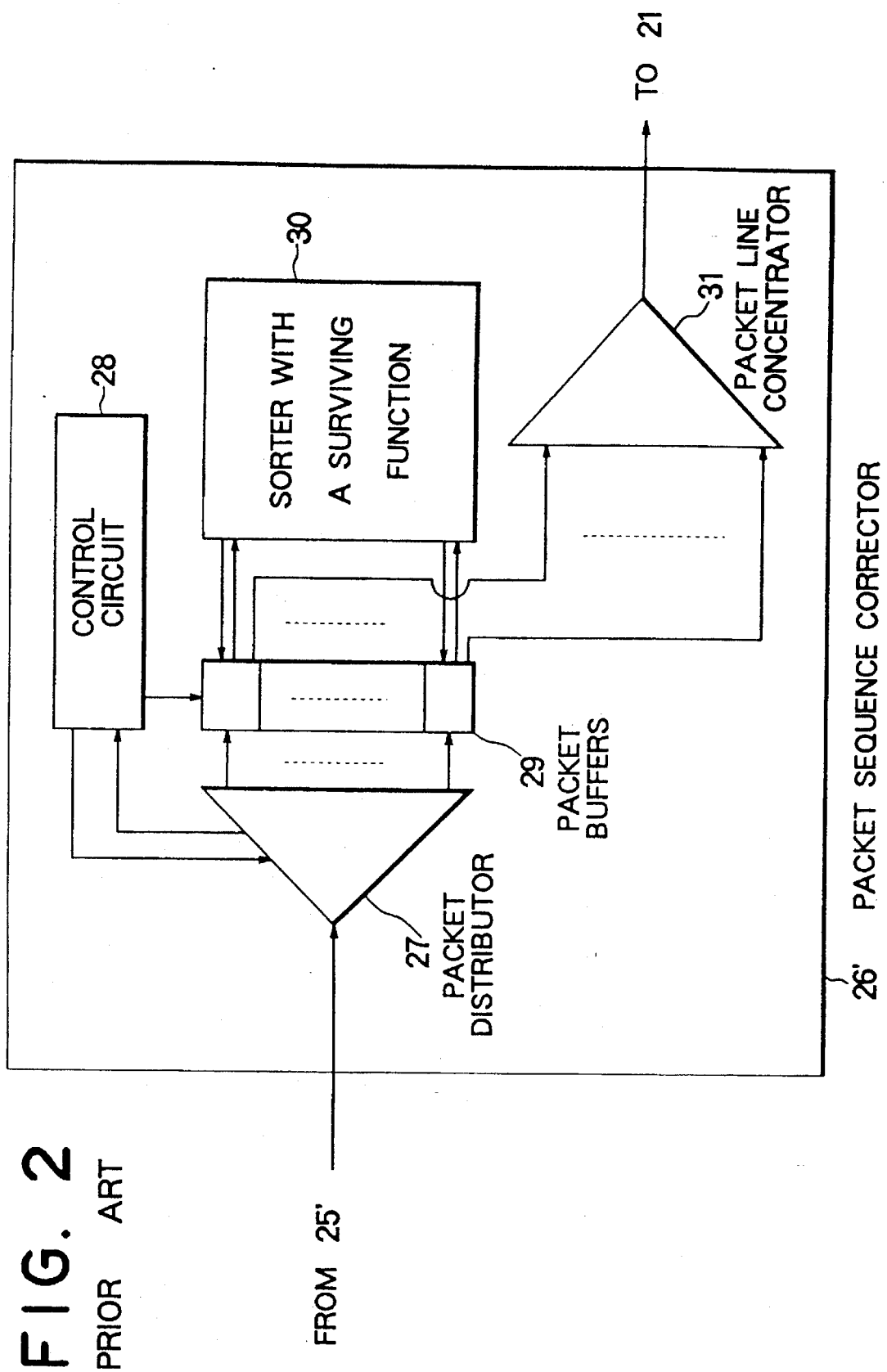

Referring to FIG. 1, a conventional packet switching system will be described in order to facilitate an understanding of this invention.

The packet switching system is composed of a 3-stage switch network and comprises a plurality of original input ports and a plurality of original output ports. Each of the original input ports is supplied with an input packet having a fixed length while each of the original output ports produces an output packet having the fixed length. Each input packet consists of a header of five bytes long and information bits of forty-eight bytes long. The header of the input packet includes a destination address indicative of destination for the input packet. Each input packet has an input period.

In the example being illustrated, the original input ports are equal in number to sixty-four while the original output ports are also equal in number to sixty-four. The original input ports are divided into first through eighth input groups 20-1, 20-2, . . . , and 20-8. Each of the first through the eighth input groups 20-1 to 20-8 comprises eight original input ports which are called first through eighth partial input ports 20-n-1 to 20-n-8, where n represents an integer which varies between one and eight, both inclusive. Similarly, the original output ports are divided into first through eighth output groups 21-1, 21-2, . . . , and 21-8. Each of the first through the eighth output groups 21-1 to 21-8 comprises eight original output ports which are referred to first through eighth partial output ports 21-n-1 to 21-n-8.

The sixty-four original input ports are connected to sixty-four original time stampers, respectively. Each original time stamper assigns a time stamp indicative of a time instant to the input packet supplied thereto to produce a time stamped packet. More particularly, the sixty-four original time stampers are divided into first through eighth stamper groups 22-1, 22-2, . . . , and 22-8. Each of the first through the eighth stamper groups 22-1 to 22-8 comprises eight original time stampers which are called first through eighth partial time stampers 22-n-1 to 22-n-8. The first through the eighth partial input ports 20-1-1 to 20-1-8 of the first input group 20-1 are connected to the first through the eighth partial time stampers 22-1-1 to 22-1-8 of the first stamper group 22-1, respectively. Likewise, the first through the eighth partial input ports 20-2-1 to 20-2-8 of the second input group 20-2 are connected to the first through the eighth partial time stampers 22-2-1 to 22-2-8 of the second stamper group 22-2, respectively. In general, the first through the eighth partial input ports 20-n-1 to 20-n-8 of an n-th input group 20-n are connected to the first through the eighth partial time stampers 22-n-1 to 22-n-8 of an n-th stamper group 22-n, respectively.

The first through the eighth stamper groups 22-1 to 22-8 are connected to first through eighth distributing switches 23'-1, 23'-2, . . . , and 23'-8, respectively. The first through the eighth distributing switches 23'-1 to 23'-8 are collectively operable as a first stage switch. More specifically, each of the first through the eighth distributing switches 23'-1 to 23'-8 has first through eighth distributing input lines and first through eighth distributing output lines. Each of the first through the eighth distributing switches 23'-1 to 23'-8 connects the first through the eighth distributing input lines with the first through the eighth distributing output lines in one-to-one correspondence irrespective of destination indicated by the destination addresses of the time stamped packets supplied thereto. Each of the first through the eighth distributing switches 23'-1 to 23'-8 produces distributed packets. A connection condition between the distributing input lines and the distributing output lines varies in synchronism with the input period. The first through the eighth distributing input lines of the first distributing switch 23'-1 are connected to the first through the eighth partial time stampers 22-1-1 to 22-1-8 of the first stamper group 22-1, respectively. Similarly, the first through the eighth distributing input lines of the second distributing switch 23'-2 are connected to the first through the eighth partial time stampers 22-2-1 to 22-2-8 of the second stamper group 22-2, respectively. In general, the first through the eighth distributing input lines of an n-th distributing switch 23'-n are connected to the first through the eighth partial time stampers 22-n-1 to 22-n-8 of an n-th stamper group 22-n, respectively.

The first through the eighth distributing switches 23'-1 to 23'-8 are connected to first through eighth primary routing switches 24'-1, 24'-2, . . . , and 24'-8 in a cross link connection fashion. The first through the eighth primary routing switches 24'-1 to 24'-8 collectively serve as a second stage switch. More particularly, each of the first through the eighth primary routing switches 24'-1 to 24'-8 has first through eighth primary routing input lines and first through eighth primary routing output lines. The first through the eighth distributing output lines of the first distributing switch 23'-1 are connected to the first primary routing input lines of the first through the eighth primary routing switches 24'-1 to 24'-8, respectively. Likewise, the first through the eighth distributing output lines of the second distributing switch 23'-2 are connected to the second primary routing input lines of the first through the eighth primary routing switches 24'-1 to 24'-8, respectively. In general, the first through the eighth distributing output lines of the n-th distributing switch 23'-n are connected to n-th primary routing input lines of the first through the eighth primary routing switches 24'-1 to 24'-8, respectively. Each of the first through the eighth primary routing switches 24'-1 to 24'-8 carries out a primary routing switching operation on the distributed packets supplied thereto on the basis of the destination addresses included in the respective distributed packets to produce primary routing switched packets.

The first through the eighth primary routing switches 24'-1 to 24'-8 are connected to first through eighth secondary routing switches 25'-1, 25'-2, . . . , and 25'-8 in the cross link connection fashion. The first through the eighth secondary routing switches 25'-1 to 25'-8 collectively act as a third stage switch. More specifically, each of the first through the eighth secondary routing switches 25'-1 to 25'-8 has first through eighth secondary routing input lines and first through eighth secondary routing output lines. The first through the eighth primary routing output lines of the first primary routing switch 24'-1 are connected to the first secondary routing input lines of the first through the eighth secondary routing switches 25'-1 to 25'-8, respectively. Similarly, the first through the eighth primary routing output lines of the second primary routing switches 24'-2 are connected to the second secondary routing input lines of the first through the eighth secondary routing switches 25'-1 to 25'-8, respectively. In general, the first through the eighth primary routing output lines of the n-th primary routing switch 24'-n are connected to n-th secondary routing input lines of the first through the eighth secondary routing switches 25'-1 to 25'-8, respectively. Each of the first through the eighth secondary routing switches 25'-1 to 25'-8 carries out a secondary routing switching operation on the primary routing switched packets supplied thereto on the basis of the destination addresses included in the respective primary routing switched packets to produce secondary routing switched packets.

The first through the eighth secondary routing switches 25'-1 to 25'-8 are connected to sixty-four original packet sequence correctors. Each original packet sequence corrector corrects sequence of the secondary routing switched packets successively supplied thereto on the basis of the time stamps assigned to the respective secondary routing switched packets to successively produce sequence corrected packets. More particularly, the sixty-four original packet sequence correctors are divided into first through eighth corrector groups 26'-1, 26'-2, . . . , and 26'-8. Each of the first through the eighth corrector groups 26'-1 to 26'-8 comprises eight original packet sequence correctors which are referred to as first through eighth partial packet sequence correctors 26'-n-1 to 26'-n-8. The first through the eighth secondary routing output lines of the first secondary routing switch 25'-1 are connected to the first through the eighth partial packet sequence correctors 26'-1-1 to 26'-1-8 of the first corrector group 26'-1, respectively. Likewise, the first through the eighth secondary routing output lines of the second secondary routing switch 25'-2 are connected to the first through the eighth partial packet sequence correctors 26'-2-1 to 26'-2-8 of the second corrector group 26'-2, respectively. In general, the first through the eighth secondary routing output lines of the n-th secondary routing switch 25'-n are connected to the first through the eighth partial packet sequence correctors 26'-n-1 to 26'-n-8 of an n-th corrector group 26'-n, respectively.

The sixty-four original packet sequence correctors are connected to the sixty-four original output ports, respectively. Each original output port produces, as the output packet, the sequence corrected packet supplied thereto. More specifically, the first through the eighth partial packet sequence correctors 26'-1-1 to 26'-1-8 of the first corrector group 26'-1 are connected to the first through the eighth partial output ports 21-1-1 to 21-1-8 of the first output group 21-1, respectively. Similarly, the first through the eighth partial packet sequence correctors 26'-2-1 to 26'-2-8 of the second corrector group 26'-2 are connected to the first through the eighth partial output ports 21-2-1 to 21-2-8 of the second output group 21-2, respectively. In general, the first through the eighth partial packet sequence correctors 26'-2-1 to 26'-2-8 of the n-th corrector group 26'-n are connected to the first through the eighth partial output ports 21-n-1 to 21-n-8 of the n-th output group 21-n, respectively.

Turning to FIG. 2, the packet sequence corrector 26' (suffix omitted) comprises a packet distributor 27, a control circuit 28, packet buffers 29, a sorter 30 with a surviving function, and a packet line concentrator 31.

The packet sequence corrector 26' is successively supplied with the secondary routing switched packets from the secondary routing switch 25' (suffixed omitted). The secondary routing switched packets are supplied to the packet distributor 27. The packet distributor 27 distributes the secondary routing switched packets under the control of the control circuit 28 to make the packet buffers 29 which become free store the secondary routing switched packets as stored packets. When any packet in the stored packets is continuously stored in any one of the packet buffers 29 for a time duration longer than a predetermined time interval, the packet buffers 29 deliver all of the stored packets to the sorter 30 in response to a buffer control signal supplied from the control circuit 28.

The sorter 30 selects, as a selected packet, one of the stored packets that is assigned with the time stamp indicating the earliest time instant. The sorter 30 delivers a selection control signal to a selected one of the packet buffers 29 that stores the selected packet. Responsive to the selection control signal, the selected packet buffer 29 sends the selected packet to the packet line concentrator 31. The packet line concentrator 31 delivers the selected packet as the sequence corrected packet to the output port 21 (suffix omitted). The predetermined time interval is equal to a difference between the maximum delay time interval and the minimum delay time interval for which the input fixed-length packet passes through the primary routing switch 24' (suffix omitted) and the secondary routing switch 25'.

At any rate, the packet sequence corrector 26' carries out a packet sequence correction operation only when a particular stored packet is continuously stored in any one of the packet buffers 29 for the time duration longer than the predetermined time interval. Therefore, the particular stored packet is placed in the wait state although there is no reversal for sequence of the stored packets. As a result, the conventional packet switching system is defective in that it has the larger delay time for the packets, as mentioned in the preamble of the instant specification. In addition, it is necessary for the packet sequence corrector 26' to compare the time stamps assigned to all of the stored packets. Accordingly, the conventional packet switching system is disadvantageous in that it complicates in control, as also mentioned in the preamble of the instant specification.

Figure 3:
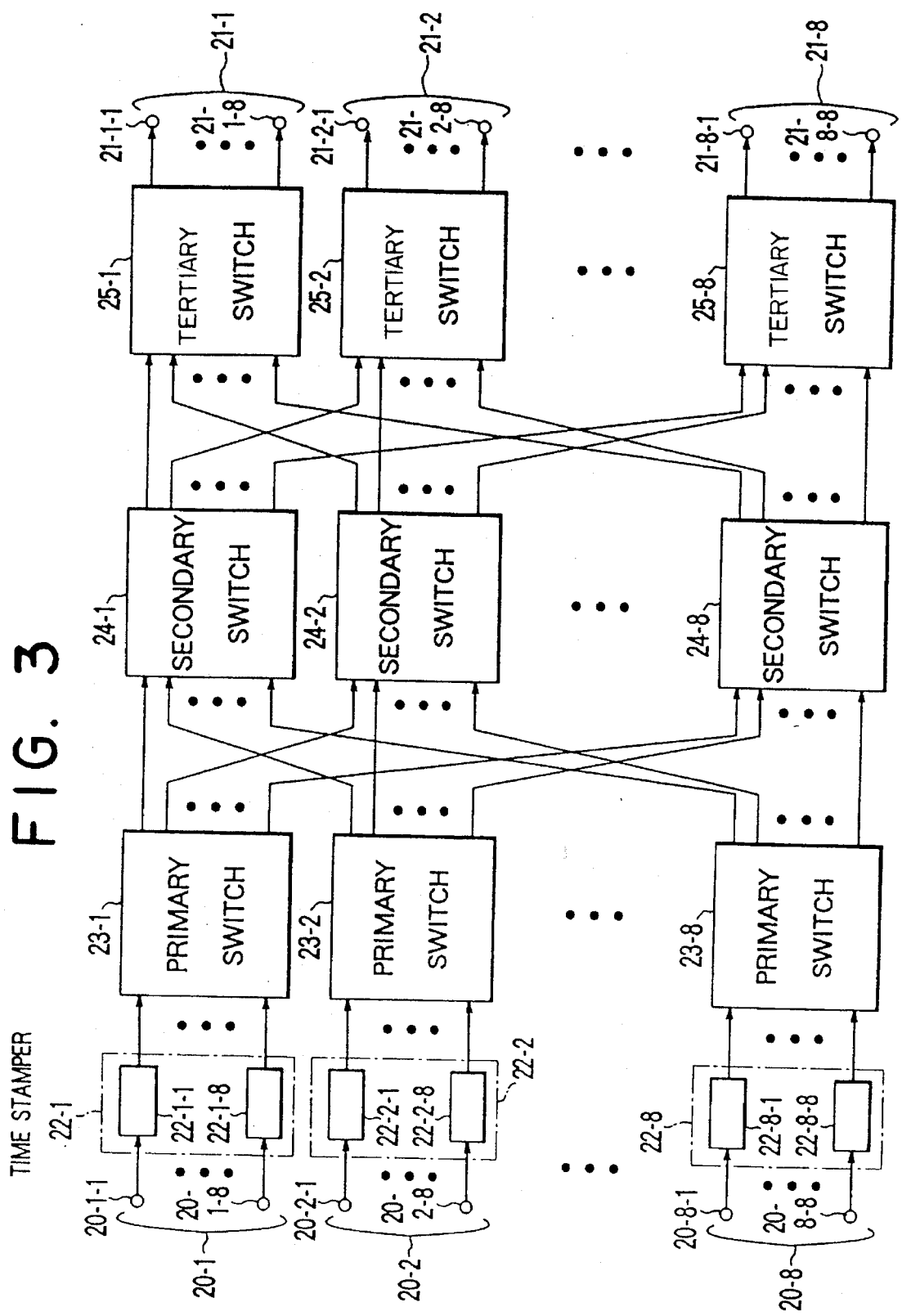
FIG. 3 is a block diagram of a packet switching system according to an embodiment of this invention.

Referring to FIG. 3, description will proceed to a packet switching system according to an embodiment of this invention. The illustrated packet switching system is composed of a 3-stage switch network which is basically similar in structure to that illustrated in FIG. 1 except that the sixty-four original packet sequence correctors are omitted. The packet switching system comprises the sixty-four original time stampers, first through eighth primary switches 23-1, 23-2, . . . , and 23-8, first through eighth secondary switches 24-1, 24-2, . . . , and 24-8, and first through eighth tertiary switches 25-1, 25-2, . . . , and 25-8.

The sixty-four original time stampers are similar in structure to those illustrated in FIG. 1 and those descriptions are omitted for the purpose of simplification of description.

The first through the eighth primary switches 23-1 to 23-8 are similar in structure and operation to the first through the eighth distributing switches 23'-1 to 23'-8. That is, the first through the eighth primary switches 23-1 to 23-8 are connected to the first through the eighth stamper groups 22-1 to 22-8, respectively. The first through the eighth primary switches 23-1 to 23-8 are collectively operable as a first stage switch. Each of the first through the eighth primary switches 23-1 to 23-8 has first through eighth primary input lines and first through eighth primary output lines. Each of the first through the eighth primary switches 23-1 to 23-8 carries out a primary switching operation so as to connect the first through the eighth primary input lines with the first through the eighth primary output lines in one-to-one correspondence to produce primary switched packets. The first through the eighth primary input lines of the first primary switch 23-1 are connected to the first through the eighth partial time stampers 22-1-1 to 22-1-8 of the first stamper group 22-1, respectively. Similarly, the first through the eighth primary input lines of the second primary switch 23-2 are connected to the first through the eighth partial time stampers 22-2-1 to 22-2-8 of the second stamper group 22-2, respectively, In general, the first through the eighth primary input lines of an n-th primary switch 23-n are connected to the first through the eighth partial time stampers 22-n-1 to 22-n-8 of the n-th stamper group 22-n, respectively.

The first through the eighth primary switches 23-1 to 23-8 are connected to the first through the eighth secondary switches 24-1 to 24-8 in a cross link connection fashion. The first through the eighth secondary switches 24-1 to 24-8 collectively serve as a second stage switch. The first through the eighth secondary switches 24-1 to 24-8 are similar in structure and operation to the first through the eighth primary routing switches 24'-1 to 24'-8. That is, each of the first through the eighth secondary switches 24-1 to 24-8 has first through eighth secondary input lines and first through eighth secondary output lines. The first through the eighth primary output lines of the first primary switch 23-1 are connected to the first secondary input lines of the first through the eighth secondary switches 24-1 to 24-8, respectively. Likewise, the first through the eighth primary output lines of the second primary switch 23-2 are connected to the second secondary input lines of the first through the eighth secondary switches 24-1 to 24-8, respectively. In general, the first through the eighth primary output lines of the n-th primary switch 23-n are connected to n-th secondary input lines of the first through the eighth secondary switches 24-1 to 24-8, respectively. Each of the first through the eighth secondary switches 24-1 to 24-8 carries out a secondary switching operation on the primary switched packets supplied thereto on the basis of the destination addresses included in the respective primary switched packets to produce secondary switched packets.

The first through the eighth secondary switches 24-1 to 24-8 are connected to the first through the eighth tertiary switches 25-1 to 25-8 in the cross link connection fashion. The first through the eighth tertiary switches 25-1 to 25-8 collectively act as a third stage switch. In the manner which will later become clear, the first through the eighth tertiary switches 25-1 to 25-8 are different in structure and operation from the first through the eighth secondary routing switches 25'-1 to 25'-8. Each of the first through the eighth tertiary switches 25-1 to 25-8 has first through eighth tertiary input lines and first through eighth tertiary output lines. The first through the eighth secondary output lines of the first secondary switch 24-1 are connected to the first tertiary input lines of the first through the eighth tertiary switches 25-1 to 25-8, respectively. Similarly, the first through the eighth secondary output lines of the second secondary switch 24-2 are connected to the second tertiary input lines of the first through the eighth tertiary switches 25-1 to 25-8, respectively. In general, the first through the eighth secondary output lines of the n-th secondary switch 24-n are connected to n-th tertiary input lines of the first through the eighth tertiary switches 25-1 to 25-8, respectively. Each of the first through the eighth tertiary switches 25-1 to 25-8 comprises a sequence correcting section for correcting sequence of the secondary switched packets successively supplied thereto on the basis of the time stamps assigned to the respective, secondary switched packets to successively produce sequence corrected packets and a switching section for carrying out a tertiary switching operation on the sequence corrected switched packets on the basis of the destination addresses included in the respective sequence corrected packets to produce tertiary switched packets.

The first through the eighth tertiary switches 25-1 to 25-8 are connected to the sixty-four original output ports. Each original output port produces, as the output packet, the tertiary switched packet supplied thereto. More specifically, the first through the eighth tertiary output lines of the first tertiary switch 25-1 are connected to the first through the eighth partial output ports 21-1-1 to 21-1-8 of the first output group 21-1, respectively. Similarly, the first through the eighth tertiary output lines of the second tertiary switch 25-2 are connected to the first through the eighth partial output ports 21-2-1 to 21-2-8 of the second output group 21-2, respectively. In general, the first through the eighth tertiary output lines of the n-th tertiary switch 25-n are connected to the first through the eighth partial output ports 21-n-1 to 21-n-8 of the n-th output group 21-n, respectively.

Figure 4:
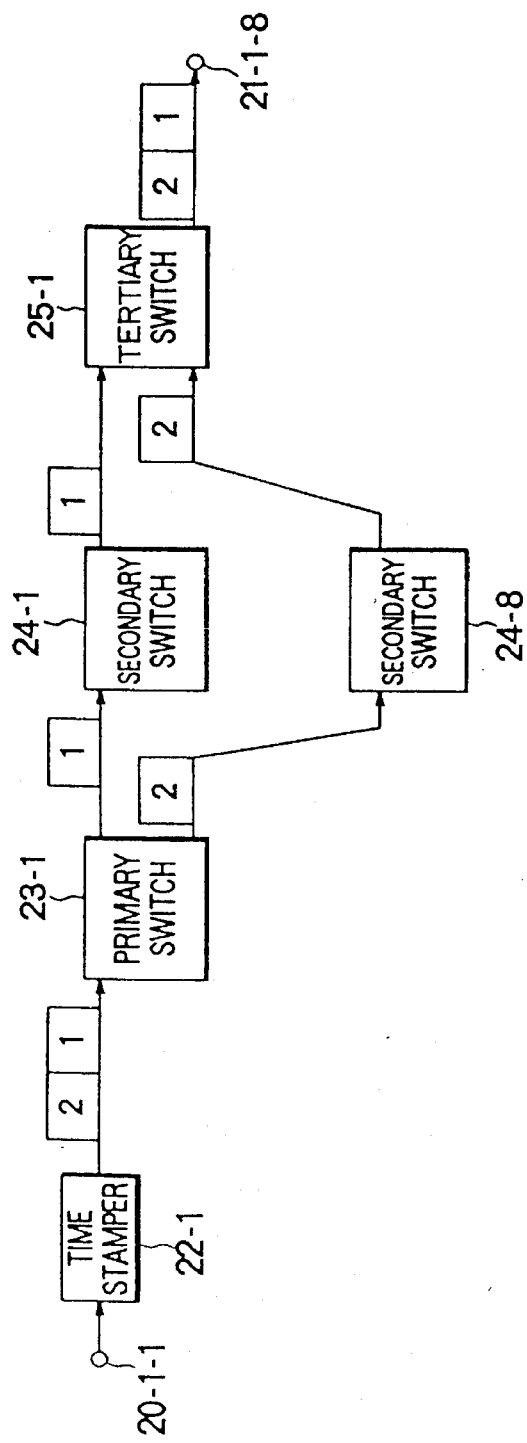
FIG. 4 is a diagram of use in describing operation of the packet switching system illustrated in FIG. 3.
Figure 5:
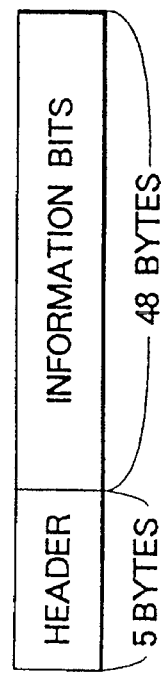
FIG. 5 shows a signal format of a packet supplied to the packet switching system illustrated in FIG. 3.

Referring to FIG. 4, description will proceed to a basic operation of the packet switching system shown in FIG. 3. Attention will be directed to two input packets which are called first and second input packets and which are successively supplied to the first partial input port 20-1-1 of the first input group 20-1. It will be assumed that each of the first and the second input packets has a header including the same destination address of the eighth partial output port 21-1-8 of the first output group 21-1. Each of the first and the second input packets consists of the header of five bytes long and information bits of forty-eight bytes long, as shown in FIG. 5.

The first and the second input packets are successively supplied to the first partial time stamper 22-1-1 of the first stamper group 22-1. The first partial time stamper 22-1-1 of the first stamper group 22-1 assigns a first time stamp labelled "1" to the first input packet to produce a first time stamped packet and subsequently assigns a second time stamp labelled "2" to the second input packet to produce a second time stamped packet, as shown in FIG. 4. The first and the second time stamped packets are successively supplied to the first primary switch 23-1. The first primary switch 23-1 carries out the primary switching operation on the first and the second time stamped packets. When the first time stamped packet is supplied to the first primary switch 23-1, the first primary switch 23-1 connects the first primary input line with the first primary output line. Therefore, the first time stamped packet is delivered as a first primary switched packet from the first primary switch 23-1 to the first secondary switch 24-1. When the second time stamped packet is supplied to the first primary switch 23-1, the first primary switch 23-1 connects the first primary input line with the eighth primary output line. Therefore, the second time stamped packet is delivered as a second primary switched packet from the first primary switch 23-1 to the eighth secondary switch 24-8.

The first secondary switch 24-1 carries out the secondary switching operation on the first primary switched packet on the basis of the destination address included in the first primary switched packet. Inasmuch as the first primary switched packet has the header including the destination address of the eighth partial output port 21-1-8 of the first output group 21-1, the first secondary switch 24-1 delivers the first primary switched packet as a first secondary switched packet to the first tertiary switch 25-1. Similarly, the eighth secondary switch 24-8 carries out the secondary switching operation on the second primary switched packet on the basis of the destination address included in the second primary switched packet. Inasmuch as the second primary switched packet has the header including the destination address of the eighth partial output port 21-1-8 of the first output group 21-1, the eighth secondary switch 24-8 delivers the second primary switched packet as a second secondary switched packet to the first tertiary switch 25-1.

It will be presumed that the first secondary switch 24-1 stores a lot of primary switched packets. Under the circumstances, the first secondary switched packet arrives in the first tertiary switch 25-1 at a time instant which is later than that at which the second secondary switched packet arrives in the first tertiary switch 25-1, as shown in FIG. 4. In this event, the first tertiary switch 25-1 corrects sequence of the second and the first secondary switched packets on the basis of the second and the first time stamps to successively produce as the first and the second secondary switched packets as first and second sequence corrected packets. Subsequently, the first tertiary switch 25-1 carries out the tertiary switching operation on the first and the second sequence corrected packets on the basis of the destination addresses included in the first and the second sequence corrected packets. Inasmuch as each of the first and the second sequence corrected packets has the header including the destination address of the eighth partial output port 21-1-8 of the first output group 21-1, the first tertiary switch 25-1 delivers the first and the second sequence corrected packets as first and second output packets to the eighth partial output port 21-1-8 of the first output group 21-1.

Figure 6:
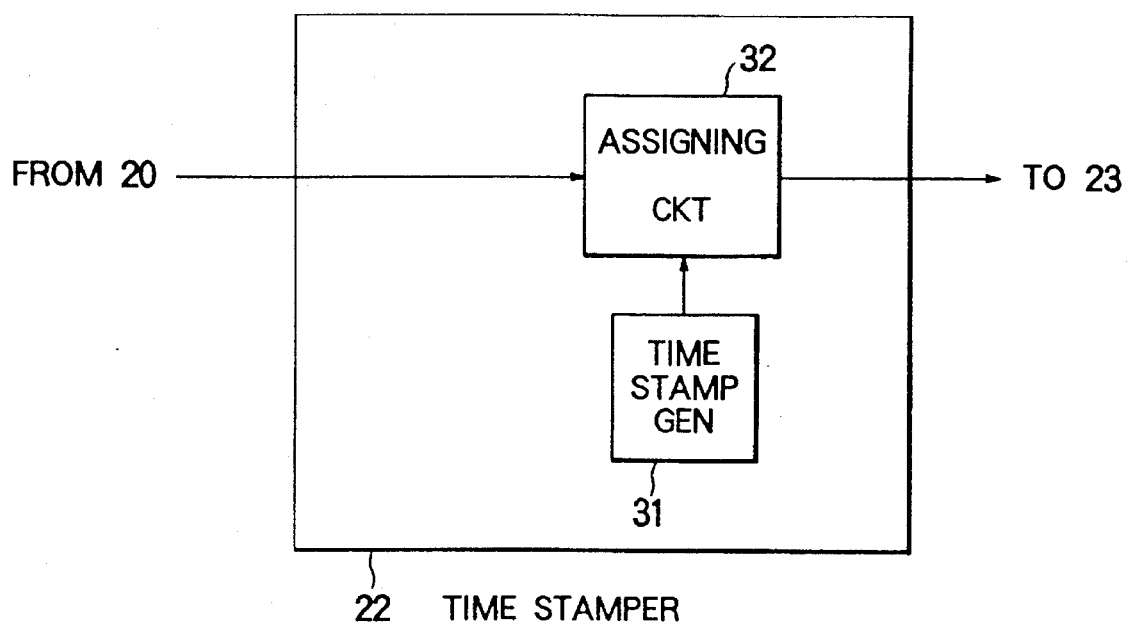
FIG. 6 is a block diagram of a time stamper for use in the packet switching system illustrated in FIG. 3.

Turning to FIG. 6, the time stamper 22 (suffixes omitted) comprises a time stamp generator 31 and an assigning circuit 32. The time stamp generator 31 generates the time stamp indicative of the time instant. The assigning circuit 32 is connected to the input port 20 (suffixed omitted) and the time stamp generator 31. Supplied with the input packet and the time stamp from the input port 20 and the time stamp generator 31, respectively, the assigning circuit 32 assigns the time stamp to a predetermined position in the header of the input packet to produce the time stamped packet. The time stamped packet is delivered to the primary switch 23 (suffixes omitted). The time stamp generator 31 renews the time stamp to be assigned to the input packet every input period. It is noted that the time stamp does not indicate the time instant in itself but indicates number information of order in which the input packet is supplied to the time stamper 22.

Figure 7:
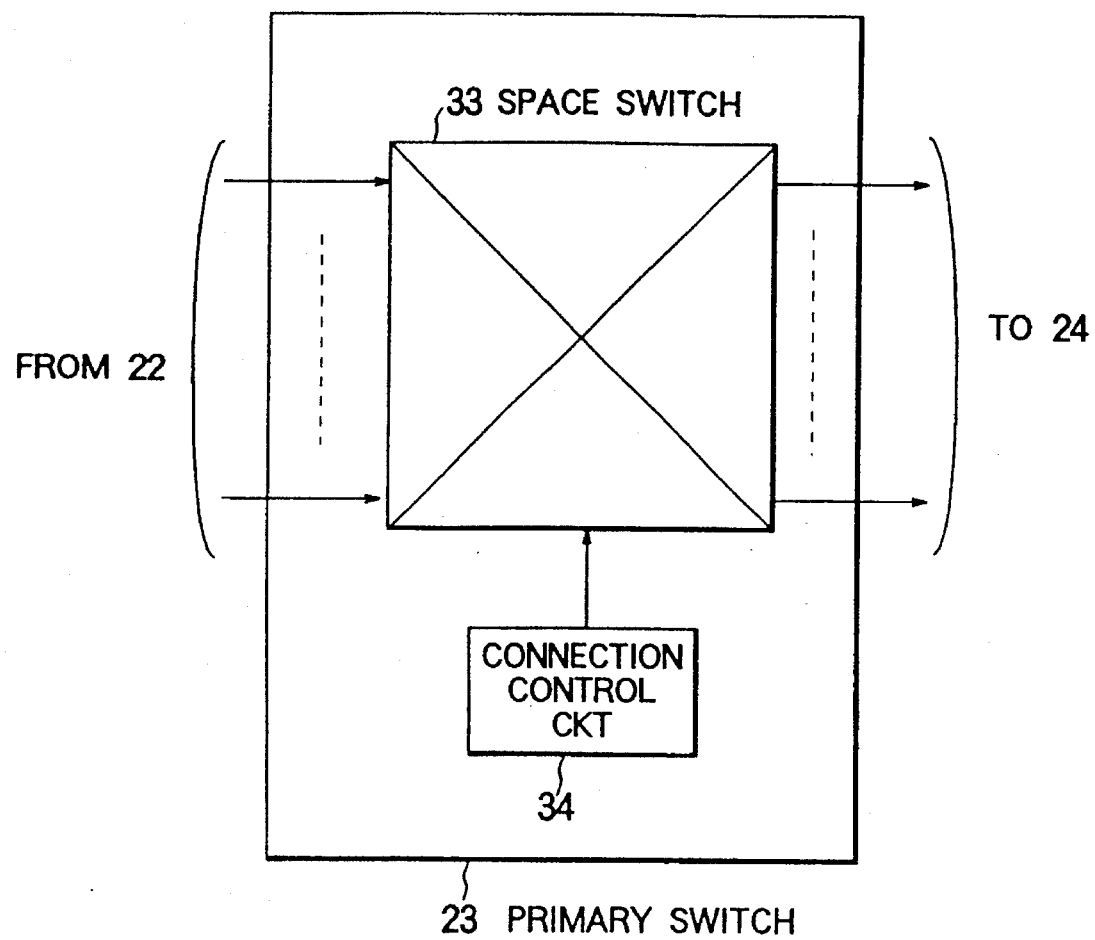
FIG. 7 is a block diagram of a primary switch for use in the packet switching system illustrated in FIG. 3.

Turning to FIG. 7, the primary switch 23 (suffixes omitted) comprises a space switch 33 and a connection control circuit 34. The space switch 33 has first through eighth space input terminals and first through eighth space output terminals. The first through the eighth space input terminals are connected via the first through the eight primary input lines to the first through the eighth partial time stampers 22-n-1 to 22-n-8 of the n-th stamper group 22-n, respectively. The first through the eighth space output terminals are connected via the first through the eighth primary output lines to the n-th secondary input lines of the first through the eighth secondary switches 24-1 to 24-8, respectively. The space switch 33 connects the first through the eighth space input terminals with the first through the eighth space output terminals in one-to-one correspondence. The space switch 33 has a control input terminal connected to the connection control circuit 34. The connection control circuit 34 controls connection relationships between the space input terminals and the space output terminals of the space switch 33. More specifically, the connection control circuit 34 includes a memory (not shown) for storing connection data indicative of the connection relationships. The connection control circuit 34 periodically controls the connection relationships between the space input terminals and the space output terminals of the space switch 33 by periodically reading the connection data from the memory.

Instead of periodically controlling of the connection relationships, the connection control circuit 34 may randomly control the connection relationships between the space input terminals and the space output terminals of the space switch 33 by randomly reading the connection data from the memory. When the connection control circuit 34 randomly controls the connection relationships between the space input terminals and the space output terminals of the space switch 33, the connection control circuit 34 may comprise a random pattern generator for generating a random pattern which determines the connection relationships between the space input terminals and the space output terminals of the space switch 33.

Figure 8:
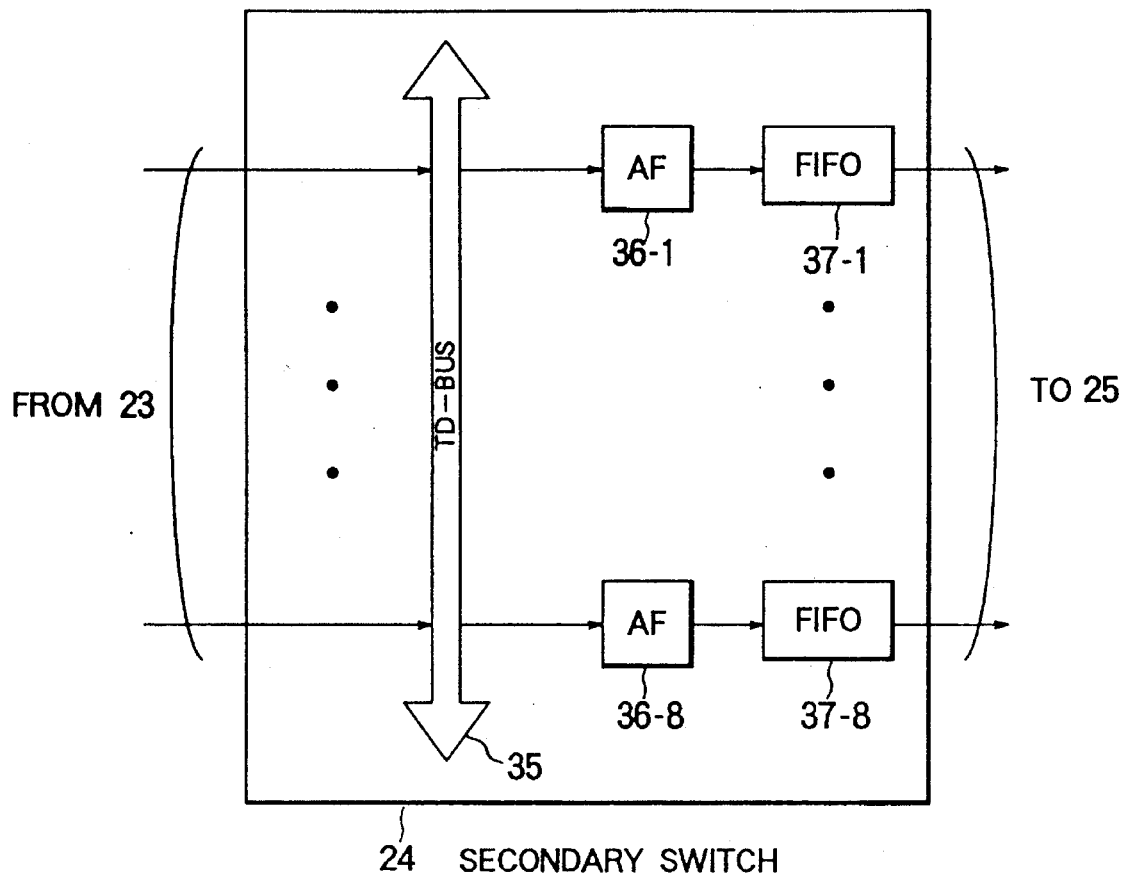
FIG. 8 is a block diagram of a secondary switch for use in the packet switching system illustrated in FIG. 3.

Turning to FIG. 8, the secondary switch 24 (suffixes omitted) comprises a time division bus (TD-BUS) 35, first through eighth address filters (AFs) 36-1 to 36-8, and first through eighth packet memories 37-1 to 37-8. The time division bus 35 is connected via the first through the eighth secondary input lines to the n-th primary output lines of the first through the eighth primary switches 23-1 to 23-8, respectively. Supplied with the primary switched packets, the time division bus 35 carries out a time division multiplexing operation on the primary switched packets to produce time division multiplexed packets. The time division bus 35 has first through eighth outgoing ports which are connected to the first through the eighth address filters 36-1 to 36-8, respectively. The first through the eighth address filters 36-1 to 36-8 preliminarily memorize, as first through eighth memorized addresses, first through eighth output line addresses of the first through the eighth secondary output lines, respectively. Supplied with the time division multiplexed packets, the first through the eighth address filters 36-1 to 36-8 detect whether or not the first through the eighth memorized addresses coincide with the destination address in the header of each of the time division multiplexed packets to receive, as first through eighth received packets, ones of the time division multiplexed packets that have the destination addresses coincident with the first through the eighth memorized addresses, respectively.

The first through the eighth addresses filters 36-1 to 36-8 are connected to the first through the eighth packet memories 37-1 to 37-8, respectively. Each of first through the eighth packet memories 37-1 to 37-8 is composed of a first-in first-out memory. The first through the eighth packet memories 37-1 to 37-8 store the first through the eighth received packets to produce first through eighth stored packets, respectively. The first through the eighth packet memories 37-1 to 37-8 are connected via the first through the eighth secondary output lines to the n-th tertiary input lines of the first through the eighth tertiary switches 25-1 to 25-8, respectively. Therefore, the first through the eighth stored packets are delivered as first through eighth secondary switched packets to the first through the eighth tertiary switches 25-1 to 25-8, respectively.

At any rate, the secondary switch 24 carries out the secondary switching operation on the primary switched packets on the destination address in the header of the primary switched packets in sequence where the primary switched packets are supplied to produce the secondary switched packets. When any packet to be produced is not stored in the first through the eighth packet memories 37-1 to 37-8, the secondary switch 24 produces, as the secondary switched packet, an empty packet indicative of empty of the packet. In the secondary switch 24, each primary switched packet has an input rate while each secondary switched packet has an output rate which is equal to integral times the input rate. The illustrated secondary switch 24 is an output buffer switch comprising the packet memories which correspond to the secondary output lines. The secondary switch 24 may be a packet switch for carrying out switching operation on packets supplied thereto without changing sequence of the packets. For example, the secondary switch 24 may be a shared buffer switch comprises a common buffer which is commonly used by all of output lines, an input buffer switch comprising buffers which correspond to input lines, or a crosspoint buffer switch comprising buffers at points where inputs and outputs cross each other.

Figure 9:
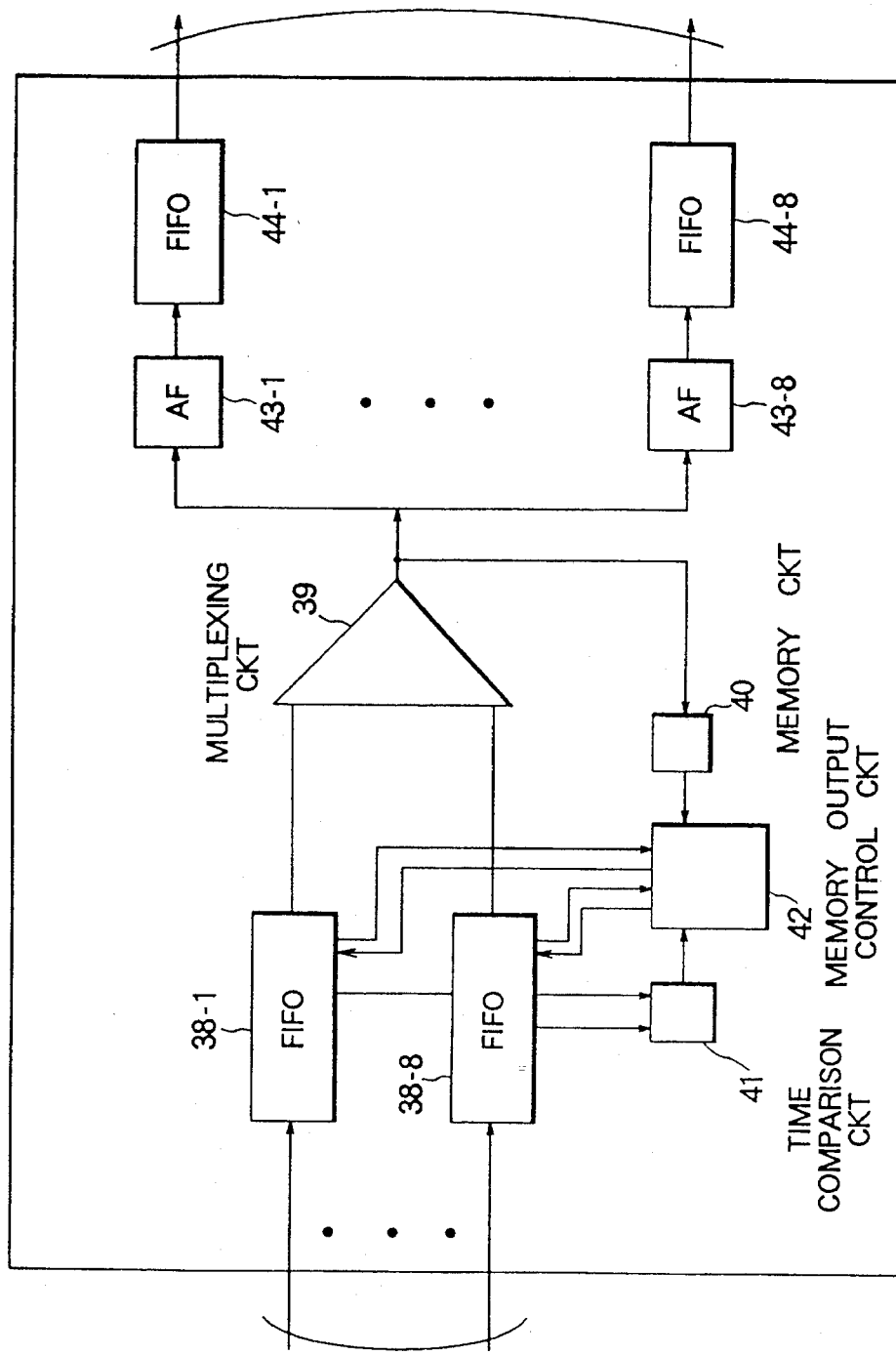
FIG. 9 is a block diagram of a tertiary switch for use in the packet switching system illustrated in FIG. 3.

Turning to FIG. 9, the tertiary switch 25 (suffixes omitted) comprises first through eighth sequence alignment memories 38-1 to 38-8, a multiplexing circuit 39, a memory circuit 40, a time comparison circuit 41, a memory output control circuit 42, first through eighth address filters (AFs) 43-1 to 43-8, and first through eighth packet memories 44-1 to 44-8.

The first through the eighth sequence alignment memorizes 38-1 to 38-8 are connected via the first through the eighth tertiary input lines to the n-th secondary output lines of the first through the eighth secondary switches 24-1 to 24-8, respectively. Each of the first through the eighth sequence alignment memories 38-1 to 38-8 is composed of a first-in first-out memory. Supplied with first through eighth secondary switched packets from the first through the eighth secondary switches 24-1 to 24-8, the first through the eighth sequence alignment memories 38-1 to 38-8 store the first through the eighth secondary switched packets as first through eighth sequence aligned packets, respectively. The first through the eighth sequence alignment memories 38-1 to 38-8 are connected to the multiplexing circuit 39. Supplied with the first through the eighth sequence aligned packets, the multiplexing circuit 39 multiplexes the first through the eighth sequence aligned packets into a multiplexed packet. The multiplexing circuit 39 is connected to the memory circuit 40. Supplied with the multiplexed packet, the memory circuit 40 stores, as a stored time stamp, the time stamp assigned to the last outputted multiplexed packet.

The first through the eighth sequence alignment memories 38-1 to 38-8 are also connected to the time comparison circuit 41. The time comparison circuit 41 receives, as the earliest inputted time stamps, the time stamps assigned to the earliest inputted packets in the sequence aligned packets stored in the first through the eighth sequence alignment memories 38-1 to 38-8 and then determines whether or not a particular one of the earliest inputted packets is continuously stored in any one of the first through the eighth sequence alignment memories 38-1 to 38-8 for a time duration longer than a predetermined time interval which is equal to the maximum delay time interval for the secondary switch 24 (suffixes omitted). The time comparison circuit 41 produces a lapse signal when the particular earliest inputted packets is continuously stored in any one of the first through the eighth sequence alignment memories 38-1 to 38-8 for the time duration longer than the predetermined time interval.

The memory output control circuit 42 is connected to the first through the eighth sequence alignment memories 38-1 to 38-8, the memory circuit 40, and the time comparison circuit 41. The memory output control circuit 42 receives the earliest inputted time stamps and selects, as the least time stamp, one of the earliest inputted time stamps that indicates the least time instant among the time instants indicated by the earliest inputted time stamps on the basis of the lapse signal and the stored time stamp. Subsequently, the memory output control circuit 42 controls the first through the eighth sequence alignment memories 38-1 to 38-8 so as to make the first through the eighth sequence alignment memories 38-1 to 38-8 output the particular earliest inputted packet having the least time stamp.

Therefore, a combination of the first through the eighth sequence alignment memories 38-1 to 38-8, the multiplexing circuit 39, the memory circuit 40, the time comparison circuit 41, and the memory output control circuit 42 acts as the sequence correcting section. In the sequence correcting section, the memory circuit 40 and the time comparison circuit 41 may be omitted.

The multiplexing circuit 39 is connected to the first through the eighth address filters 43-1 to 43-8. The first through the eighth address filters 43-1 to 43-8 preliminarily memorize, as first through eighth memorized addresses, first through eighth output line addresses of the first through the eighth tertiary output lines, respectively. Successively supplied with the multiplexed packets, the first through the eighth address filters 43-1 to 43-8 detect whether or not the first through the eighth memorized addresses coincide with the destination address in the header of each of the multiplexed packets to receive, as first through eighth received packets, the multiplexed packets which have the destination addresses coincident with the first through the eighth memorized addresses, respectively.

The first through the eighth address filters 43-1 to 43-8 are connected to the first through the eighth packet memories 44-1 to 44-8, respectively. Each of the first through the eighth packet memories 44-1 to 44-8 is composed of a first-in first-out memory. The first through the eighth packet memories 44-1 to 44-8 store the first through the eighth received packets to produce first through eighth stored packets, respectively. The first through the eighth packet memories 44-1 to 44-8 are connected via the first through the eighth tertiary output lines to the first through the eighth partial output ports 21-n-1 to 21-n-8 of the n-th output group, respectively. Therefore, the first through the eighth stored packets are delivered as first through eighth output packets to the first through the eighth partial output ports 21-n-1 to 21-n-8 of the n-th output group, respectively.

Therefore a combination of the first through the eighth address filters 43-1 to 43-8 and the first through the eighth packet memories 44-1 to 44-8 serves as the switching section.

Figure 10:
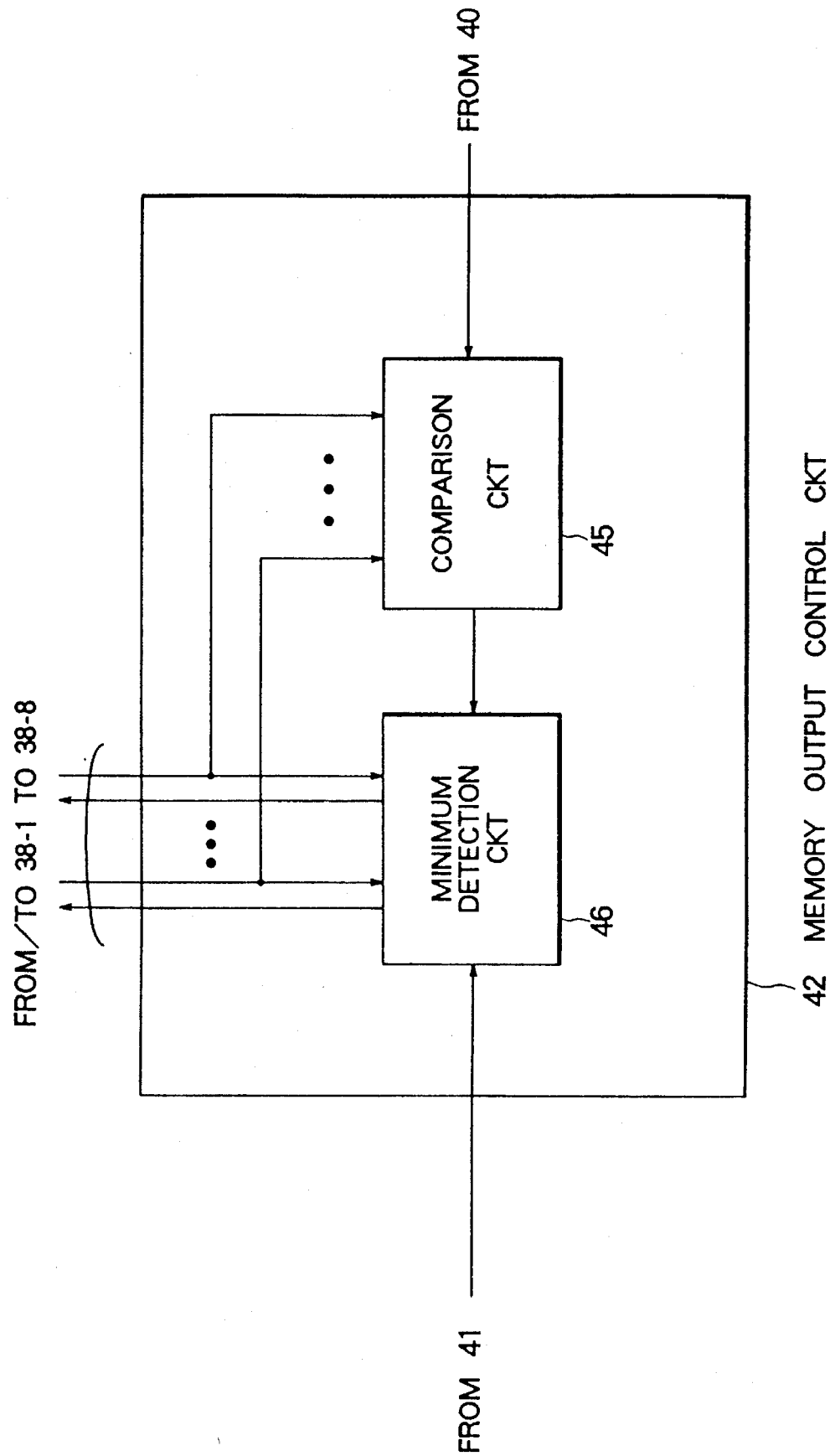
FIG. 10 is a block diagram of a memory output control circuit for use in the tertiary switch illustrated in FIG. 9.

Turning to FIG. 10, the memory output control circuit 42 comprises a comparison circuit 45 and a minimum detection circuit 46. The comparison circuit 45 is connected to the first through the eighth sequence alignment memories 38-1 to 38-8 and the memory circuit 40. Supplied with the earliest inputted time stamps and the stored time stamp, the comparison circuit 45 compares the stored time stamp with each of the earliest inputted time stamps to produce a coincidence signal when the stored time stamp coincides with any one of the earliest inputted time stamps. When the earliest inputted time stamps are received from all of the first through the eighth sequence alignment memories 38-1 to 38-8, the minimum detection circuit 46 selects one of the earliest inputted time stamps as the least time stamp to deliver a control signal to the first through the eighth sequence alignment memories 38-1 to 38-8 so as to output the particular earliest inputted packet having the least time stamp. Responsive to the lapse signal, the minimum detection circuit 46 also delivers the control signal to the first through the eighth sequence alignment memories 38-1 to 38-8 so as to output the particular earliest inputted packet having the least time stamp. Responsive to the coincidence signal, the minimum detection circuit 46 furthermore delivers the control signal to the first through the eighth sequence alignment memories 38-1 to 38-8 so as to output the particular earliest inputted packet having the least time stamp.

As apparent from the above-mentioned description in conjunction with FIGS. 9 and 10, the tertiary switch 25 carries out the sequence correction operation on the secondary switched packets by the sequence correcting section in an input part thereof. The tertiary switch 25 waits each of the secondary switched packets for a wait time which is equal to the maximum delay time for the secondary switch 24. In other words, the tertiary switch 25 has the wait time for each of the secondary switched packets without regard to the delay time for the tertiary switch 25. In addition, the tertiary switch 25 selects the particular earliest inputted packet having the least time stamp not only when each of the secondary switched packets is waited for the predetermined time interval but also when the secondary switched packets are stored in all of the first through the eighth sequence alignment memories 38-1 to 38-8 or when any one of the earliest inputted time stamps coincide with the time stamp assigned to the last outputted multiplexed packet. As a result, it is possible to reduce the delay time for each packet in the tertiary switch 25.

Figure 11:
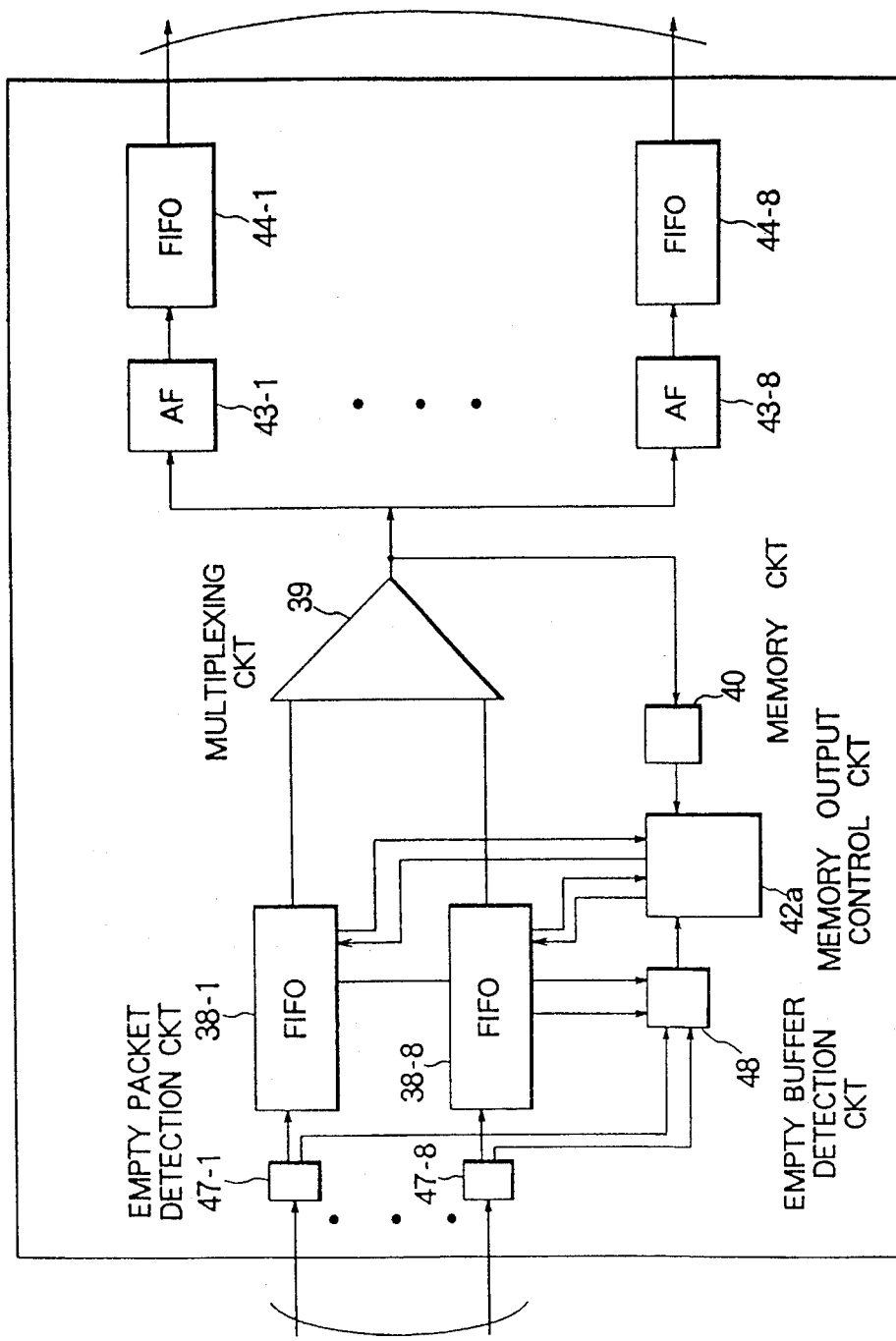
FIG. 11 is a block diagram of another tertiary switch for use in the packet switching system illustrated in FIG. 3.

Turning to FIG. 11, another tertiary switch 25a is similar in structure to that illustrated in FIG. 9 except that the memory output control circuit 42 is modified into another memory output control circuit 42a in the manner which will later become clear and the tertiary switch 25a comprises first through eighth empty packet detection circuits 47-1 to 47-8 and an empty buffer detection circuit 48 in place of the time comparison circuit 41.

The first through the eighth empty packet detection circuits 47-1 to 47-8 are connected via the first through the eighth tertiary input lines to the n-th secondary output lines of the first through the eighth secondary switches 24-1 to 24-8, respectively. Supplied with the secondary switched packet, each of the first through the eighth empty packet detection circuits 47-1 to 47-8 determines whether or not the secondary switched packet supplied thereto is the empty packet. When the supplied secondary switched packet is the empty packet, each of the first through the eighth empty packet detection circuits 47-1 to 47-8 produces an empty packet detection signal. Otherwise, the first through the eighth empty packet detection circuits 47-1 to 47-8 delivers the supplied secondary switched packets to the first through the eighth sequence alignment memories 38-1 to 38-8, respectively.

The first through the eighth empty packet detection circuits 47-1 to 47-8 are connected to the empty buffer detection circuit 48 which is connected to the first through the eighth sequence alignment memories 38-1 to 38-8. Each of the first through the eighth sequence alignment memories 38-1 to 38-8 produces a packet absent signal when any packet is not stored therein. The empty buffer detection circuit 48 detects, in response to the empty packet detection signal and the packet absent signal, that the last outputted secondary switched packet in correspondence with any one of the first through the eighth sequence alignment memories 38-1 to 38-8 that does not store any packet is the empty packet. The empty buffer detection circuit 48 produces an absence signal or an empty detection signal when the empty buffer detection circuit 48 receives the empty packet detection signal from any one of the first through the eighth empty packet detection circuits 47-1 to 47-8 that corresponds to one of the first through the eighth sequence alignment memories 38-1 to 38-8 producing the packet absent signal.

At any rate, a combination of the first through the eighth empty packet detection circuits 47-1 to 47-8 and the empty buffer detection circuit 48 is operable as an empty packet determining arrangement for determining whether the secondary switched packets to be sent to the tertiary switch 25a are present or absent in each of the first through the eighth secondary switches 24-1 to 24-8 to produce the absence signal when the secondary switched packets to be sent to the tertiary switch 25a are absent in at least one of the first through the eighth secondary switches 24-1 to 24-8 that corresponds to one of the first through the eighth sequence alignment memories 38-1 to 38-8 having no packet.

The memory output control circuit 42a is connected to the first through the eighth sequence alignment memories 38-1 to 38-8, the memory circuit 40, and the empty buffer detection circuit 48. The memory output control circuit 42a receives the earliest inputted time stamps and selects, as the least time stamp, one of the earliest inputted time stamps that indicates the least time instant among the time instants indicated by the earliest inputted time stamps on the basis of the absence signal and the stored time stamp. Subsequently, the memory output control circuit 42a controls the first through the eighth sequence alignment memories 38-1 to 38-8 so as to make the first through the eighth sequence alignment memories 38-1 to 38-8 output the particular earliest inputted packet having the least time stamp.

More specifically, the memory output control circuit 42a comprises the comparison circuit 45 and the minimum detection circuit 46 as shown in FIG. 10. But the minimum detection circuit 46 of the memory output control circuit 42a is connected to the comparison circuit 45, the empty buffer detection circuit 48, and the first through the eighth sequence alignment memories 38-1 to 38-8. When any packet is stored in all of the first through the eighth sequence alignment memories 38-1 to 38-8 and when the earliest inputted time stamps are received from all of the first through the eighth sequence alignment memories 38-1 to 38-8, the minimum detection circuit 46 selects one of the earliest inputted time stamps as the least time stamp to deliver a control signal to the first through the eighth sequence alignment memories 38-1 to 38-8 so as to output the particular earliest inputted packet having the least time stamp. Responsive to the absence signal, the minimum detection circuit 46 also delivers the control signal to the first through the eighth sequence alignment memories 38-1 to 38-8 so as to output the particular earliest inputted packet having the least time stamp. Responsive to the coincidence signal, the minimum detection circuit 46 furthermore delivers the control signal to the first through the eighth sequence alignment memories 38-1 to 38-8 so as to output the particular earliest inputted packet having the least time stamp.

In the tertiary switch 25a, the memory circuit 40 may be omitted.

The tertiary switch 25a selects the particular earliest inputted packet having the least time stamp without delaying each secondary switched packet for a time duration longer than the predetermined time interval not only when the secondary switched packets are stored in all of the first through the eighth sequence alignment memories 38-1 to 38-8 but also when the last outputted secondary switched packet, which corresponds to any one of the first through the eighth sequence alignment memories 38-1 to 38-8 that does not store any packet, is the empty packet or when any one of the earliest inputted time stamps coincide with the time stamp assigned to the last outputted multiplexed packet by the comparison circuit 45. As a result, it is possible to reduce the delay time for each packet in the tertiary switch 25a. In addition, the tertiary switch 25a is simple in control because it is unnecessary for the tertiary switch 25a to check the delay time for each packet.

Preferably, each of the tertiary switches 25 and 25a may carry out a selection operation on the particular earliest inputted packet having the least time stamp at a selection rate which is integral times the input rate at which each input packet is supplied to each input port. Under the circumstances, each of the tertiary switches 25 and 25a can effectively carry out the sequence correction operation on the secondary switched packets and it is possible to furthermore reduce the delay time for each packet in each of the tertiary switches 25 and 25a.

In the above-mentioned embodiment, the packet switching system comprises a plurality of primary switches each of which has a plurality of primary input lines and a plurality of tertiary switches each of which has a plurality of tertiary output lines.

Figure 12:
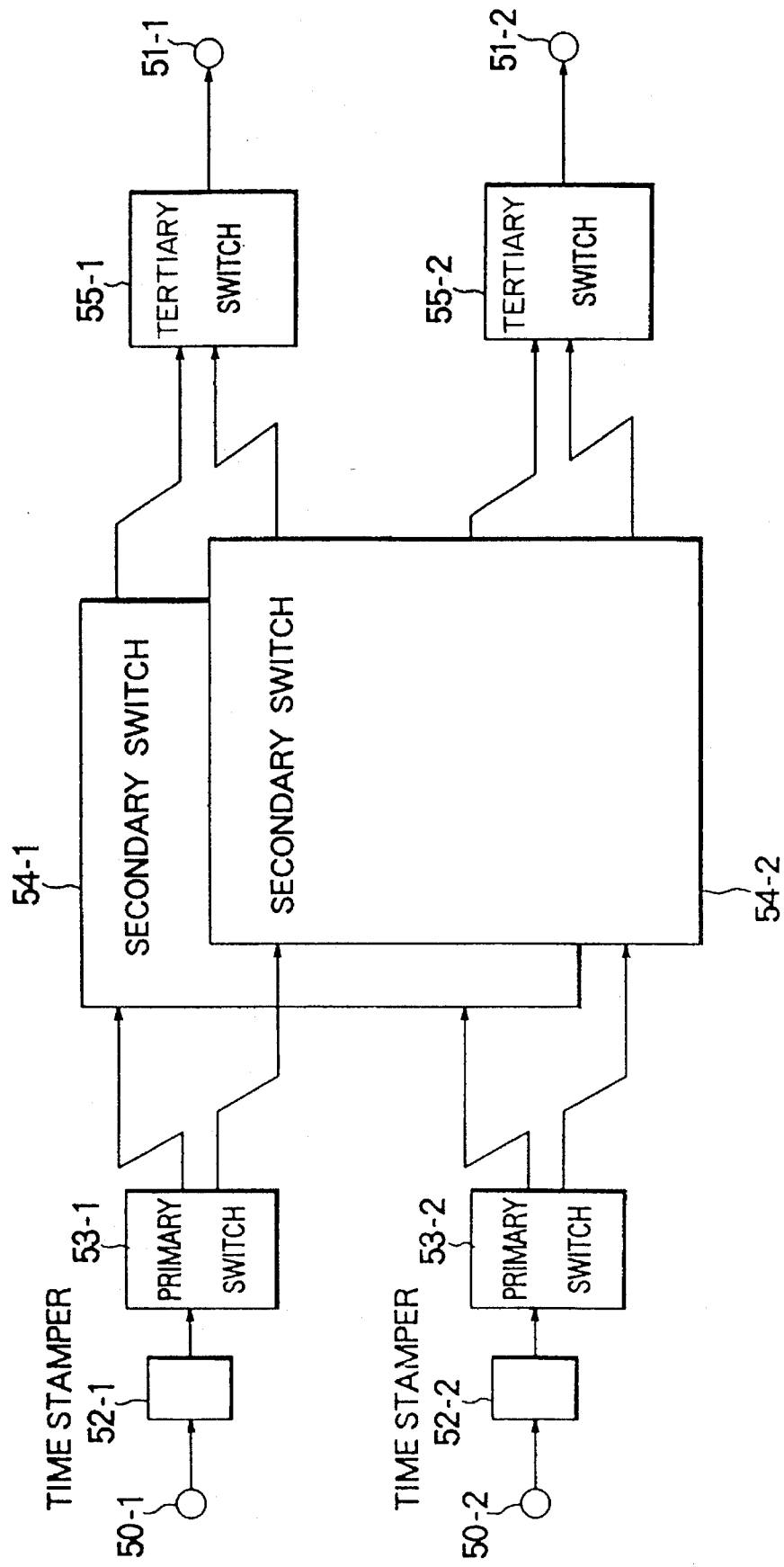
FIG. 12 is a block diagram of a packet switching system according to another embodiment of this invention.

Referring to FIG. 12, description will proceed to a packet switching system according to another embodiment comprising a plurality of primary switches each having only one primary input line and a plurality of tertiary switches each having only one tertiary output line.

The illustrated packet switching system is composed of a 3-stage switch network and has first and second input ports 50-1 and 50-2 and first and second output ports 51-1 and 51-2. Each of the first and the second input ports 50-1 and 50-2 is supplied with an input packet having a fixed-length. The first and the second output ports 51-1 and 51-2 produce first and second output packets each having the fixed-length. The input packet consists of a header of five bytes long and information bits of forty-eight bytes long. The header of the input packet includes a destination address indicative of destination for the input packet in question.

The packet switching system comprises first and second time stampers 52-1 and 52-2 which are connected to the first and the second input ports 50-1 and 50-2, respectively. Each of the first and the second time stampers 52-1 and 52-2 assigns a time stamp indicative of an input time instant to the input packet supplied thereto to produce a time stamped packet.

The first and the second time stampers 52-1 and 52-2 are connected to first and second primary switches 53-1 and 53-2, respectively. Each of the first and the second primary switches 53-1 and 53-2 has a primary input line and first and second primary output lines. Each of the first and the second primary switches 53-1 and 53-2 carries out a primary switching operation on the time stamped packet supplied thereto so as to selectively connect the primary input line with the first and the second primary output lines to produce primary switched packets. In other words, each of the first and the second primary switches 53-1 and 53-2 serves as a distributor for distributing the time stamped packet into distributed packets as the primary switched packets.

The first and the second primary switches 53-1 and 53-2 are connected to first and second secondary switches 54-1 and 54-2 in a cross link connection fashion. Each of the first and the second secondary switches 54-1 and 54-2 has first and second secondary input lines and first and second secondary output lines. The first secondary input lines of the first and the second secondary switches 54-1 and 54-2 are connected to the first and the second primary output lines of the first primary switch 53-1, respectively. Likewise, the second secondary input lines of the first and the second secondary switches 54-1 and 54-2 are connected to the first and the second primary output lines of the second primary switch 53-2, respectively. Each of the first and the second secondary switches 54-1 and 54-2 carries out a secondary switching operation on the primary switched packets supplied thereto in sequence on the basis of the destination addresses included in the respective primary switched packets to produce secondary switched packets.

The first and the second secondary switches 54-1 and 54-2 are connected to first and second tertiary switches 55-1 and 55-2 in the cross link connection fashion. Each of the first and the second tertiary switches 55-1 and 55-2 has first and second tertiary input lines and a tertiary output line. The first tertiary input lines of the first and the second tertiary switches 55-1 and 55-2 are connected to the first and the second secondary output lines of the first secondary switch 54-1, respectively. Similarly, the second tertiary input lines of the first and the second tertiary switches 55-1 and 55-2 are connected to the first and the second secondary output lines of the second secondary switch 54-2, respectively. Each of the first and the second tertiary switches 55-1 and 55-2 carries out a tertiary switching operation on the secondary switched packets on the basis of the time stamps assigned to the respective secondary switched packets. The first and the second tertiary switches 55-1 and 55-2 produce first and second tertiary switched packets, respectively. In other words, each of the first and the second tertiary switches 55-1 and 55-2 acts as a sequence corrector for correcting sequence of the secondary switched packets successively supplied thereto on the basis of the time stamps assigned to the respective secondary switched packets. The first and the second tertiary switches 55-1 and 55-2 produce first and second sequence corrected packets as the first and second tertiary switched packets, respectively.

The tertiary output lines of the first and the second tertiary switches 55-1 and 55-2 are connected to the first and the second output ports 51-1 and 51-2, respectively. Therefore, the first and the second output ports 51-1 and 51-2 produce, as the first and the second output packets, the first and the second tertiary switched packets, respectively.

Figure 13:
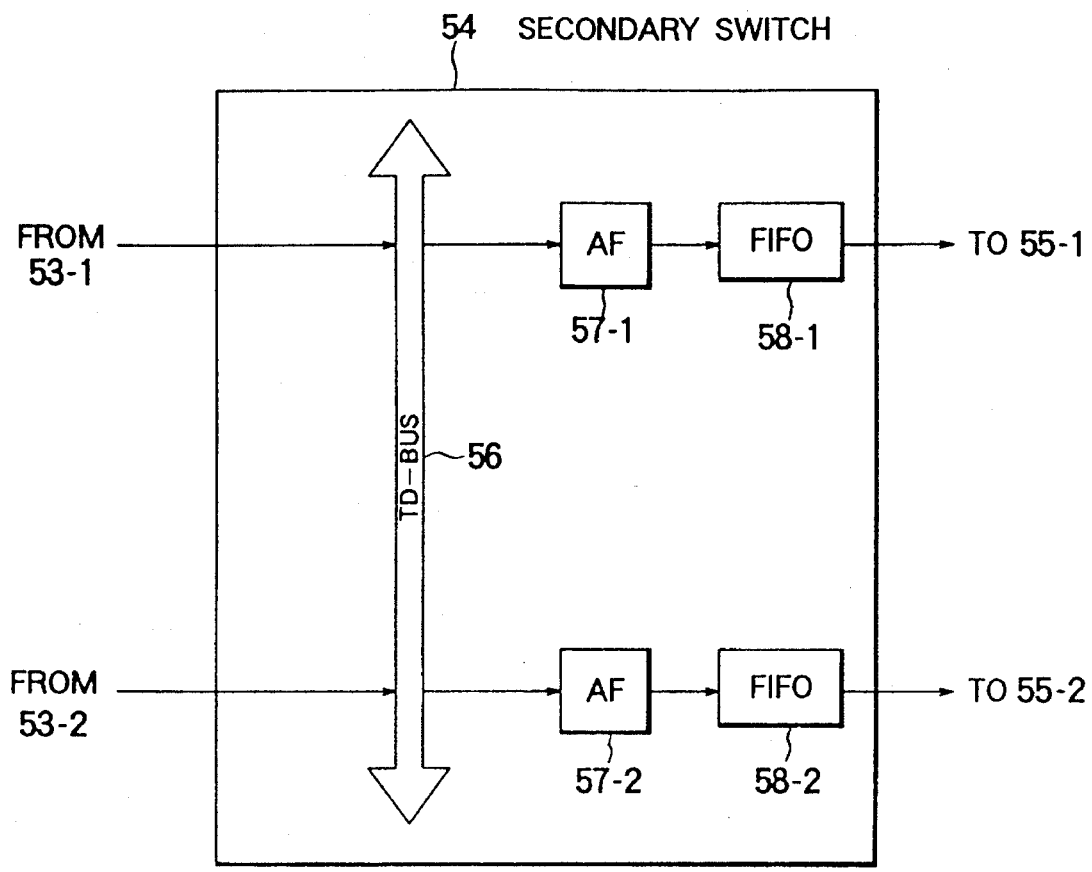
FIG. 13 is a block diagram of a secondary switch for use in the packet switching system illustrated in FIG. 12.

Turning to FIG. 13, the second secondary switch 54 (suffixes omitted) comprises a time division bus (TD-BUS) 56, first and second address filters (AFs) 57-1 and 57-2, and first and second packet memories 58-1 and 58-2. As shown in FIG. 13, the second secondary switch 54 is similar in structure and operation to that illustrated in FIG. 8 and its description is omitted for the purpose of simplification of description.

Figure 14:
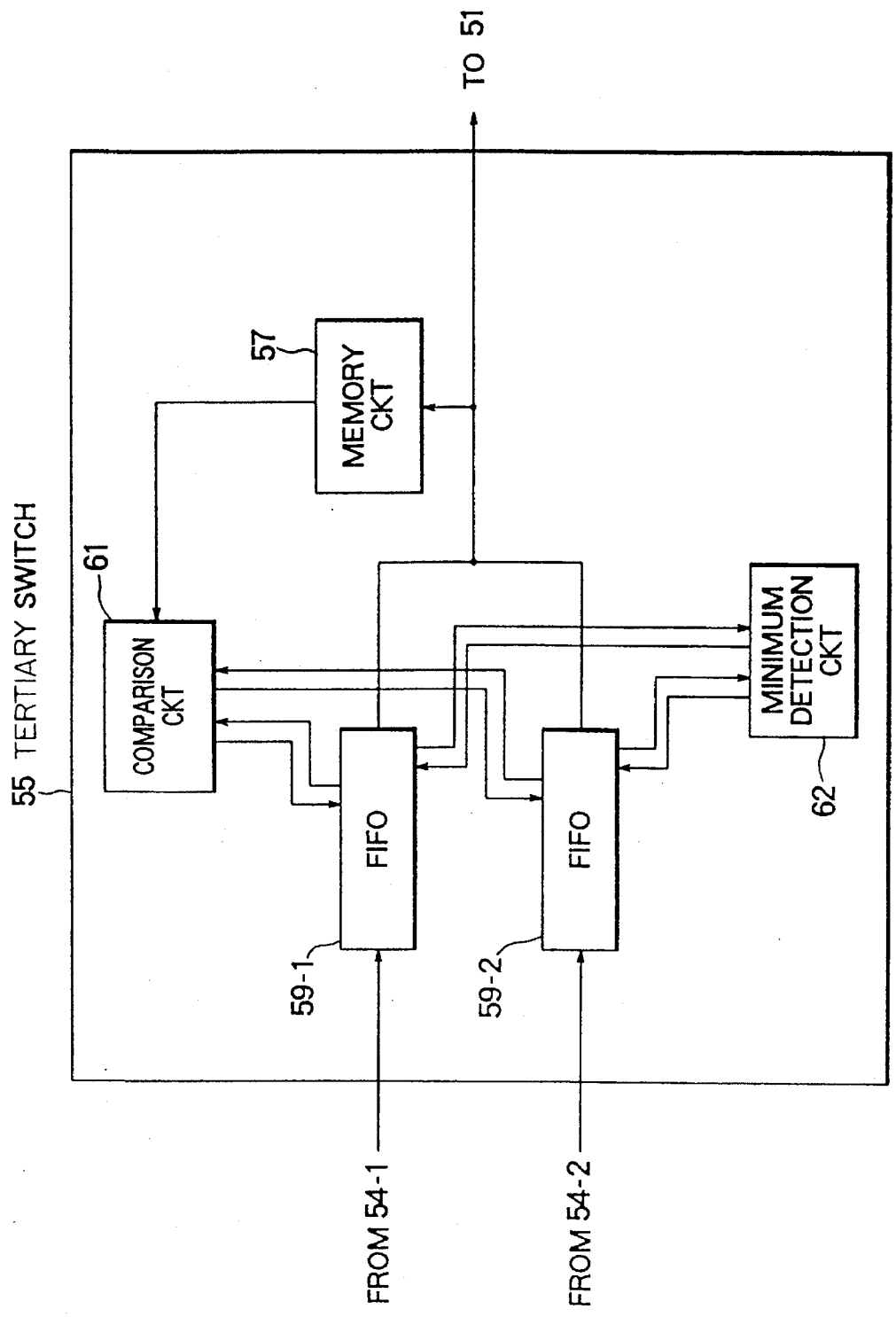
FIG. 14 is a block diagram of a tertiary switch for use in the packet switching system illustrated in FIG. 12.

Turning to FIG. 14, the tertiary switch 55 (suffixes omitted) comprises first and second packet memories 59-1 and 59-2, a memory circuit 60, a comparison circuit 61, and a minimum detection circuit 62.

The first and the second packet memories 59-1 and 59-2 are connected via the first and the second tertiary input lines to m-th secondary output lines of the first and the second secondary switches 54-1 and 54-2 (FIG. 12), respectively, where m represents an integer varying between one and two, both inclusive. Each of the first and the second packet memories 59-1 to 59-2 is composed of a first-in first-out memory. Supplied with the secondary switched packet from the first secondary switch 54-1, the first packet memory 59-1 determines whether or not the secondary switched packet is the empty packet and stores the secondary switched packet as a stored packet when the secondary switched packet is not the empty packet. Similarly, supplied with the secondary switched packet from the second secondary switch 54-2, the second packet memory 59-2 determines whether or not the secondary switched packet is the empty packet and stores the secondary switched packet as a stored packet when the secondary switched packet is not the empty packet.

The first and the second packet memories 59-1 and 59-2 are connected to the memory circuit 60. Supplied with the last outputted packet from any one of the first and the second packet memories 59-1 and 59-2, the memory circuit 57 stores, as a stored time stamp, the time stamp assigned to the last outputted packet.

The memory circuit 60 is connected to the comparison circuit 61. The comparison circuit 61 is also connected to the first and the second memories 59-1 and 59-2. The comparison circuit 61 receives, as lead time stamps, the time stamps assigned to the lead packets in the stored packets stored in the first and the second packet memories 59-1 and 59-2. Supplied with the lead time stamps and the stored time stamp, the comparison circuit 61 compares the stored time stamp with each of the lead time stamps. When the stored time stamp coincides with at least one of the lead time stamps, the comparison circuit 61 delivers a sending allowable signal to a particular one of the first and the second packet memories 59-1 and 59-2 to make the particular one of the first and the second packet memories 59-1 and 59-2 output the last outputted packet having one of the lead time stamps that coincides with the stored time stamp.

The first and the second packet memories 59-1 and 59-2 are also connected to the minimum detection circuit 62. The minimum detection circuit 62 checks whether or not any packet is stored in the first and the second packet memories 59-1 and 59-2. The minimum detection circuit 62 compares the lead time stamps each other either when any packet is stored in all of the first and the second packet memories 59-1 and 59-2 or when any of the first and the second packet memories 59-1 and 59-2 stores no packet. Subsequently, the minimum detection circuit 62 selects one of the lead time stamps that is the least time stamp indicating the least time instant among the time instants thereof to deliver another sending allowable signal to the first and the second packet memories 59-1 and 59-2 so as to output the last outputted packet having the least time stamp.

The first and the second memories 59-1 and 59-2 are furthermore connected via the tertiary output line to the output port 51 (suffixes omitted). Therefore, the last outputted packet is delivered from the output port 51 as the output packet.

In the tertiary switch 55, the memory circuit 60 and the comparison circuit 61 may be omitted.

Figure 15A:
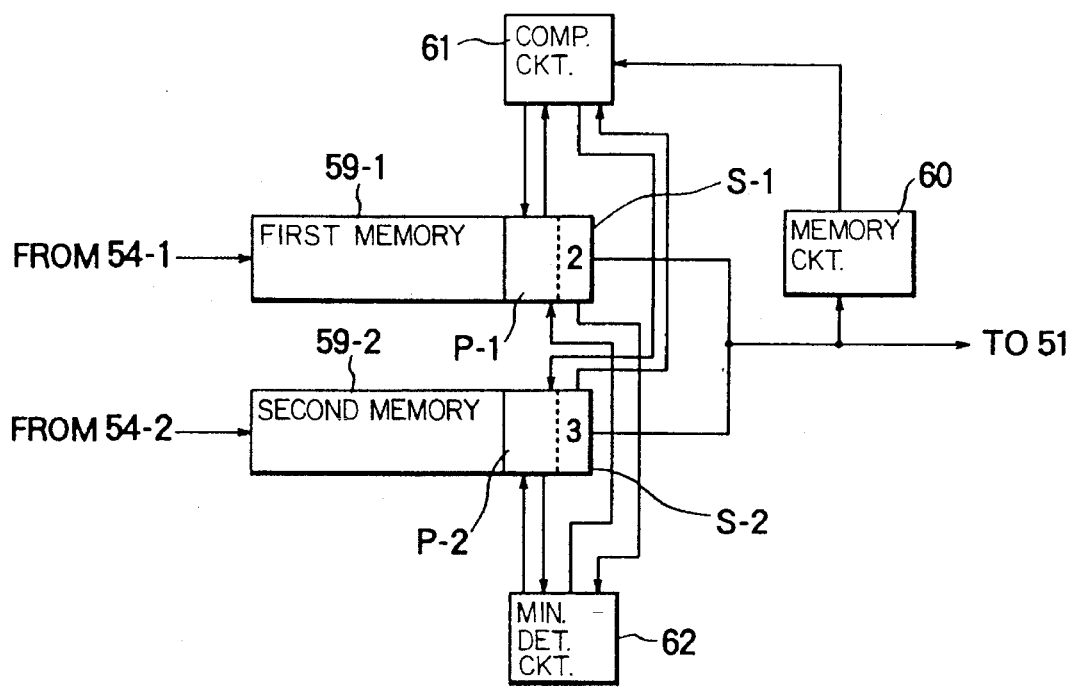
FIGS. 15A and 15B show diagrams for use in describing operation of the tertiary switch illustrated in FIG. 14.
Figure 15B:
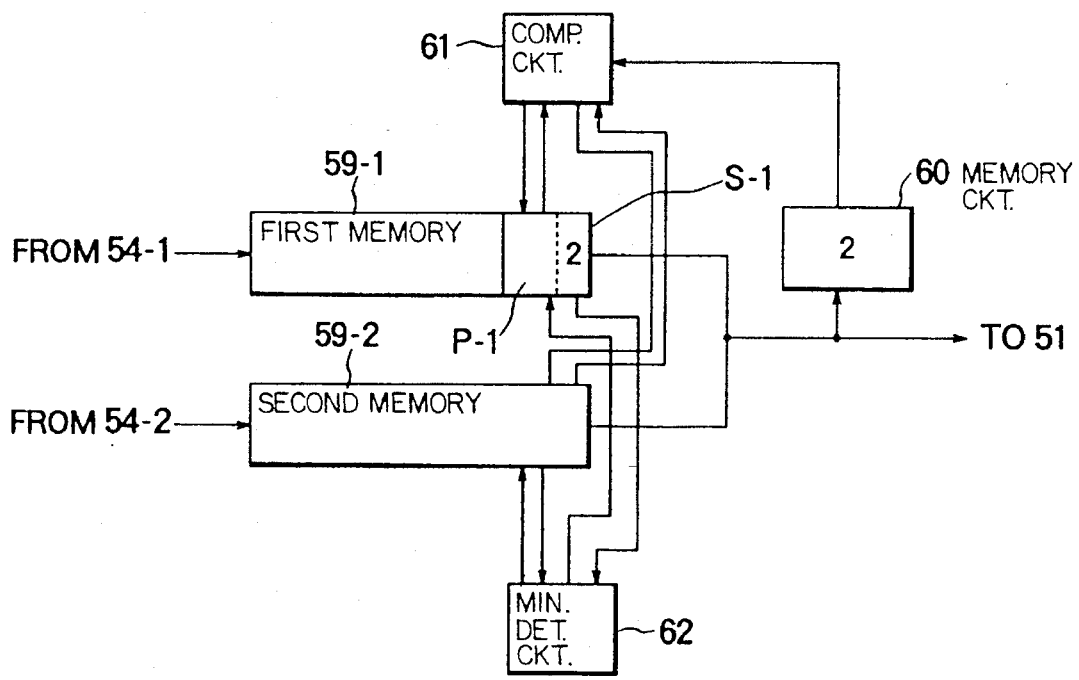

Referring to FIGS. 15A and 15B, description will proceed to operation of the tertiary switch 55 illustrated in FIG. 14. Inasmuch as each secondary switch 24 (suffix omitted) carries out the secondary switching operation on the primary switched packets in sequence, each tertiary input port of the tertiary switch 55 is successively supplied with the secondary switched packets assigned with the time stamps in the order of ascending time instants.

In FIG. 15A, it will be assumed as follows. The first memory 59-1 stores, as the lead packet in the stored packets stored therein, a first lead packet P-1 assigned with a first lead time stamp S-1 indicating a first time instant which is labelled "2". The second memory 59-2 stores, as the lead packet in the stored packets stored therein, a second lead packet P-2 assigned with a second lead time stamp S-2 indicating a second time instant which is later than the first time instant and which is labelled "3". Under the circumstances, the minimum detection circuit 62 controls the first packet memory 59-1 so as to output the first lead packet P-1 as the last outputted packet having the least time stamp. This is because the first lead packet P-1 is assigned with the first lead time stamp S-1 indicating the first time instant which is earlier than the second time instant indicated by the second lead time stamp S-2 assigned to the second lead packet P-2. The first lead time stamp S-1 of the first lead packet P-1 is stored in the memory circuit 60 as the stored time stamp. As is apparent from this, the minimum detection circuit 62 compares the lead time stamps each other and then controls the first and the second packet memories 59-1 and 59-2 so as to output the last outputted packet having the least time stamp when any packet is stored in all of the first and the second packet memories 59-1 and 59-2.

In FIG. 15B, it will be presumed as follows. In the memory circuit 60 is stored, as the stored time stamp, a time instant indicating the time instant which is labelled "2" since as the last outputted packet is produced the lead packet assigned with the time stamp indicating the time instant which is labelled "2". The first memory 59-1 stores, as the lead packet in the stored packets stored therein, a first lead packet P-1 assigned with a first lead time stamp S-1 indicating a first time instant which is labelled "2". The second memory 59-2 stores no packet. In this event, the comparison circuit 61 controls the first packet memory 59-1 so as to output the first lead packet P-1 as the last outputted packet having the least time stamp. This is because the first lead packet P-1 is assigned with the first lead time stamp S-1 indicating the first time instant which coincides with the time instant indicated by the stored time stamp stored in the memory circuit 60.

In FIG. 15B, it will be supposed that the memory circuit 60 stores, as the stored time stamp, a time stamp indicating the time instant which is labelled any number except for "2". Under the circumstances, the minimum detection circuit 62 controls the first packet memory 59-1 so as to output the first lead packet P-1 as the last outputted packet having the least time stamp. This is because the second memory 59-2 stores no packet. It is therefore possible for the tertiary switch 55 to effectively carry out packet sequence correcting operation and to reduce the delay time for the packet. This is because the tertiary switch 55 produces the tertiary switched packet although any of the packet memories stores no packet.

Figure 16:
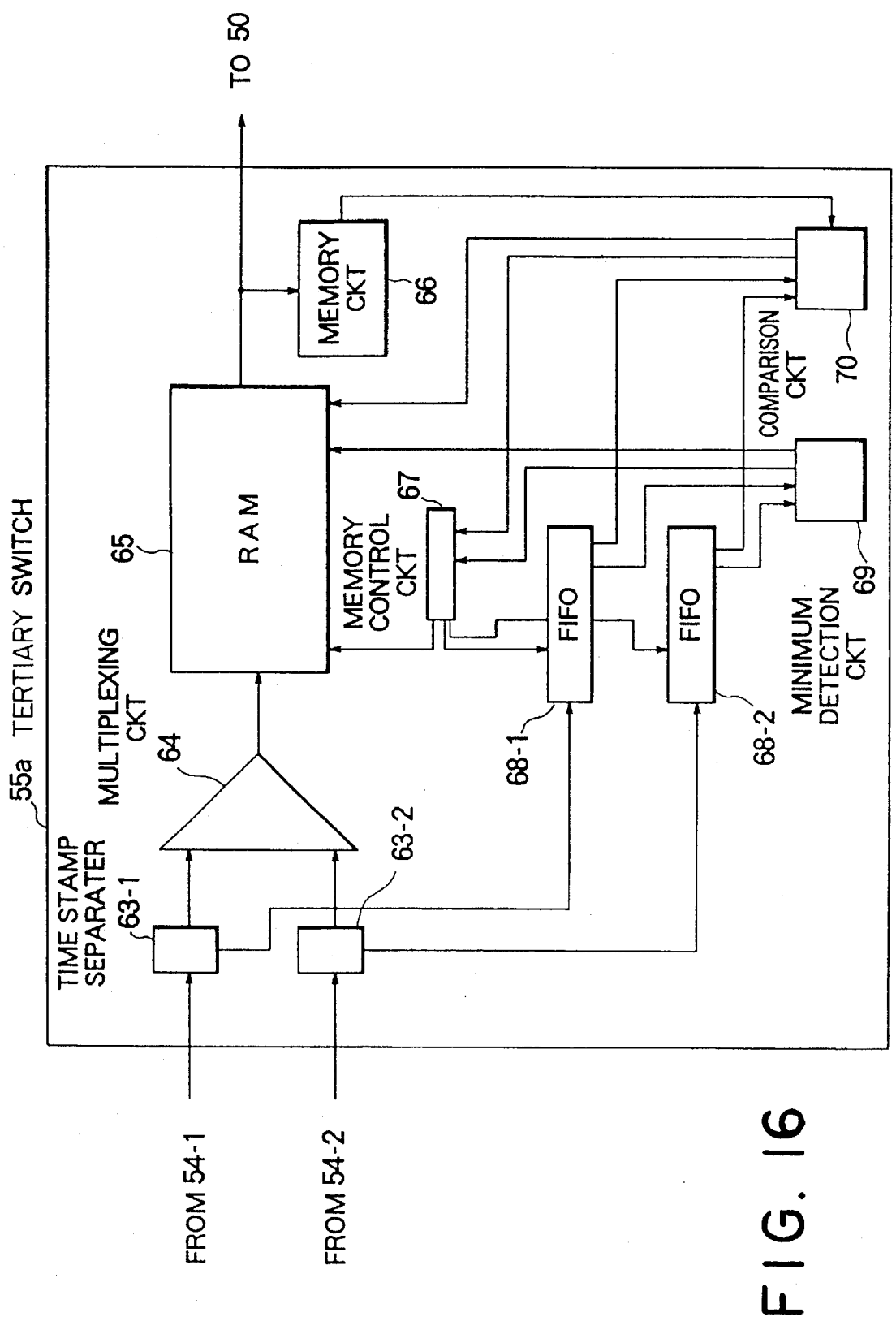
FIG. 16 is a block diagram of another tertiary switch for use in the packet switching system illustrated in FIG. 12.

Turning to FIG. 16, another tertiary switch 55a comprises first and second time stamp separators 63-1 and 63-2, a multiplexing circuit 64, a packet memory 65, a memory circuit 66, a memory control circuit 67, first and second time stamp memories 68-1 and 68-2, a minimum detection circuit 69, and a comparison circuit 70.

The first and the second time stamp separators 63-1 and 63-2 are connected via the first and the second tertiary input lines to the m-th secondary output lines of the first and the second secondary switches 54-1 and 54-2 (FIG. 12), respectively. Supplied with the secondary switched packet from the first secondary switch 54-1, the first time stamp separator 63-1 separates the time stamp from the secondary switched packet. The first time stamp separator 63-1 produces a first separated time stamp. Likewise, the second time stamp separator 63-2 separates the time stamp from the secondary switched packet which is supplied from the second secondary switch 54-2. The second time stamp separator 63-2 produces a second separated time stamp.

The first and the second time stamp separators 63-1 and 63-2 are connected to the multiplexing circuit 64. The secondary switched packets pass through the first and the second time stamp separators 63-1 and 63-2 to reach the multiplexing circuit 64. The multiplexing circuit 64 multiplexes the secondary switched packets supplied thereto into a multiplexed packet. The multiplexing circuit 64 is connected to the packet memory 65. The packet memory 65 is composed of a random access memory (RAM). Supplied with the multiplexed packet, the packet memory 65 stores the multiplexed packet as stored packet. The packet memory 65 is connected to the memory circuit 66. Supplied with the last outputted packet from the packet memory 65, the memory circuit 66 stores, as a stored time stamp, the time stamp assigned to the last outputted packet.

The packet memory 65 has a control terminal which is connected to the memory control circuit 67. The memory control circuit 67 generates a write-in address for the packet memory 65. The memory control circuit 67 is connected to the first and the second time stamp memories 68-1 and 68-2 which are connected to the first and the second time stamp separators 63-1 and 63-2, respectively. Each of the first and the second time stamp memories 68-1 and 68-2 is composed to a first-in first-out memory. Supplied with the first separated time stamp and the write-in address, the first time stamp memory 68-1 stores the first separated time stamp and the write-in address. Similarly, the second time stamp memory 68-2 stores the second separated time stamp and the write-in address which are supplied thereto.

The first and the second time stamp memories 68-1 and 68-2 are connected to the minimum detection circuit 69 which is connected to the packet memory 65 and the memory control circuit 67. The minimum detection circuit 69 is supplied with the lead time stamps in the first and the second separated time stamps stored in the first and the second time stamp memories 68-1 and 68-2 together with the corresponding write-in addresses. The minimum detection circuit 69 compares the lead time stamps each other to detect the least time stamp among the lead time stamps. The minimum detection circuit 69 delivers, as a read-out address, to the packet memory 65 the write-in address which corresponds to the least time stamp to make the packet memory 65 produce the last outputted packet. The minimum detection circuit 69 furthermore sends the read-out address to the memory control circuit 67 as an empty address for the packet memory 65.

The first and the second time stamp memories 68-1 and 68-2 are also connected to the comparison circuit 70 which is connected to the memory circuit 66. The comparison circuit 70 is furthermore connected to the packet memory 65 and the memory control circuit 67. Supplied with the lead time stamps and the stored time stamp, the comparison circuit 70 compares the stored time stamp with each of the lead time stamps to detect the least time stamp in the lead time stamps that coincides with the stored time stamp, The comparison circuit 70 delivers, as the read-out address, to the packet memory 65 the write-in address which corresponds to the least time stamp to make the packet memory 65 produce the last outputted patent. The comparison circuit 70 furthermore sends the read-out address to the memory control circuit 67 as the empty address for the packet memory 65.

The tertiary switch 55a carries out an output operation for the packet that is similar to that in the tertiary switch 55 illustrated in FIG. 14. It is possible for the tertiary switch 55a to effectively use the packet memory 65. This is because the tertiary switch 55a separates the time stamp from the secondary switched packet and comprises a common packet memory for storing the secondary switched packet.

In the packet switching system illustrated in FIG. 12, each of the first and the second secondary switches 54-1 and 54-2 may be supplied with the primary switched packets each of which has an input rate and produces the secondary switched packets each of which has an output rate that is m times the input rate, where m represents a positive integer which is not greater than the number of the secondary switches. With this structure, it is possible for each tertiary switch to shorten the time interval for which production of the tertiary switched packet stops. Accordingly, it is possible to reduce the delay time in each tertiary switch. Such a merit is available whether the tertiary switch is composed of the tertiary switch 55 illustrated in FIG. 14 or the tertiary switch 55a illustrated in FIG. 16.

Figure 17:
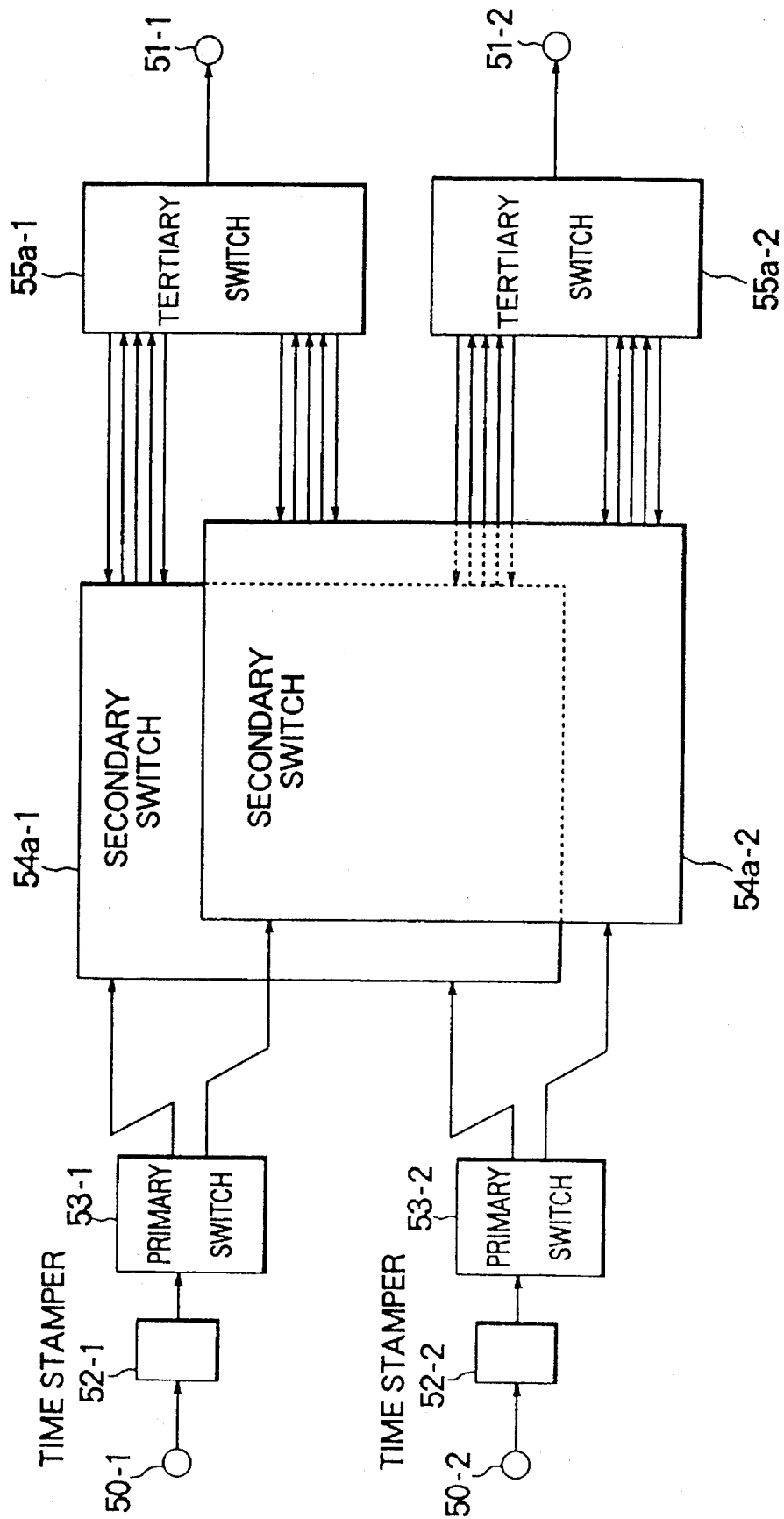
FIG. 17 is a block diagram of a packet switching system according to still another embodiment of this invention.

Referring to FIG. 17, a packet switching system according to still another embodiment is similar in structure and operation to that illustrated in FIG. 12 except that the first and the second secondary switches and the first and the second tertiary switches are modified in the manner which will later become clear. Therefore, the first and the second secondary switches and the first and the second tertiary switches are depicted at 54a-1, 54a-2, 55a-1, and 55a-2, respectively.

Figure 18:
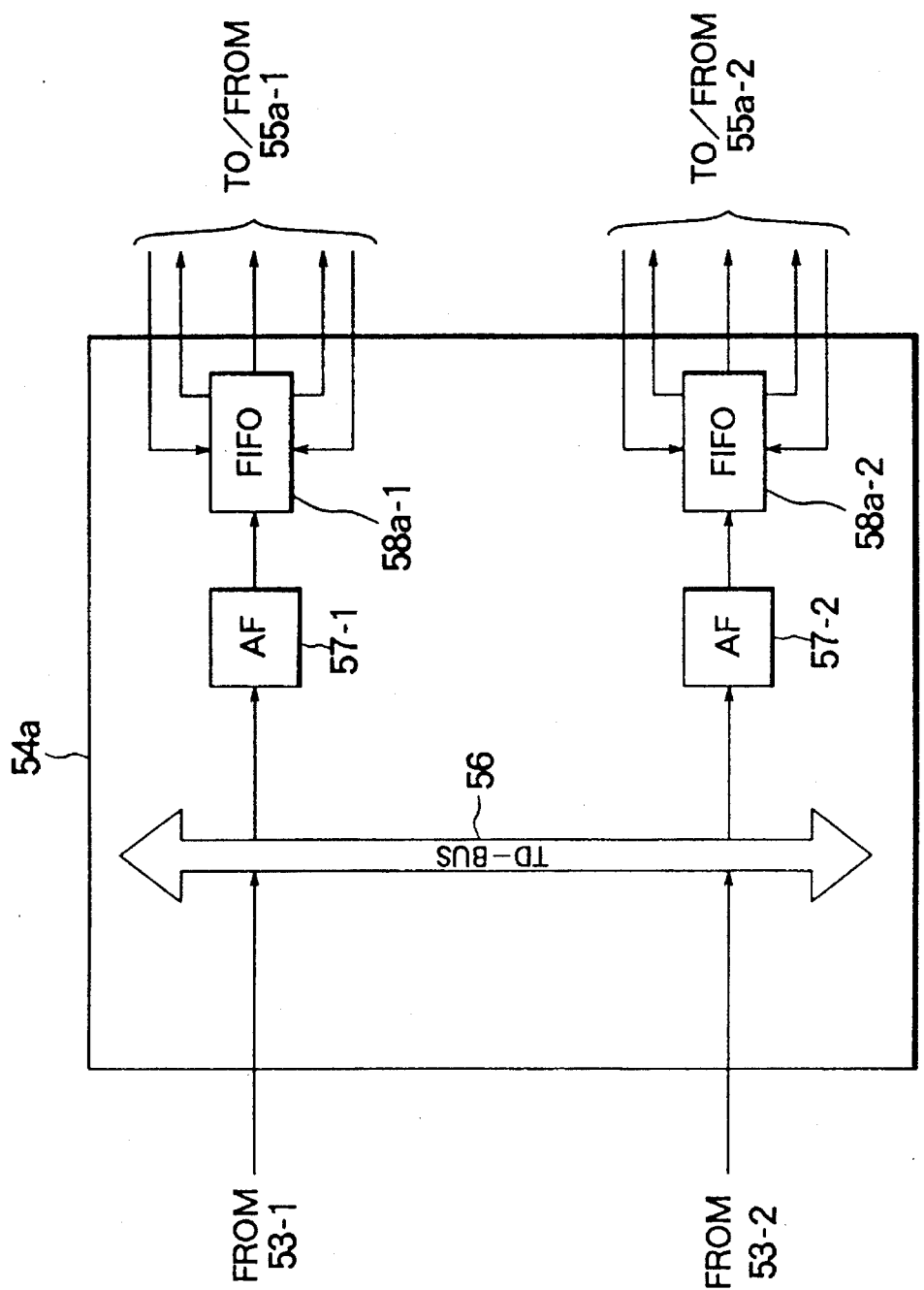
FIG. 18 is a block diagram of a secondary switch for use in the packet switching system illustrated in FIG. 17.

Turning to FIG. 18, the secondary switch 54a (suffixes omitted) is similar in structure and operation to that illustrated in FIG. 13 except that the first and the second packet memories are modified. Therefore, the first and the second packet memories are depicted at 58a-1 and 58a-2, respectively. In the manner which will later become clear, the first packet memory 58a-1 acts as a packet memory which comprises a combination of the first packet memory 58-1 (FIG. 13) and the first packet memory 59-1 of the tertiary switch 55 (FIG. 14). Similarly, the second packet memory 58a-2 serves as a packet memory which is composed of a combination of the second packet memory 59-2 (FIG. 13) and the second packet memory 58-2 of the tertiary switch 55 (FIG. 14).

Figure 19:
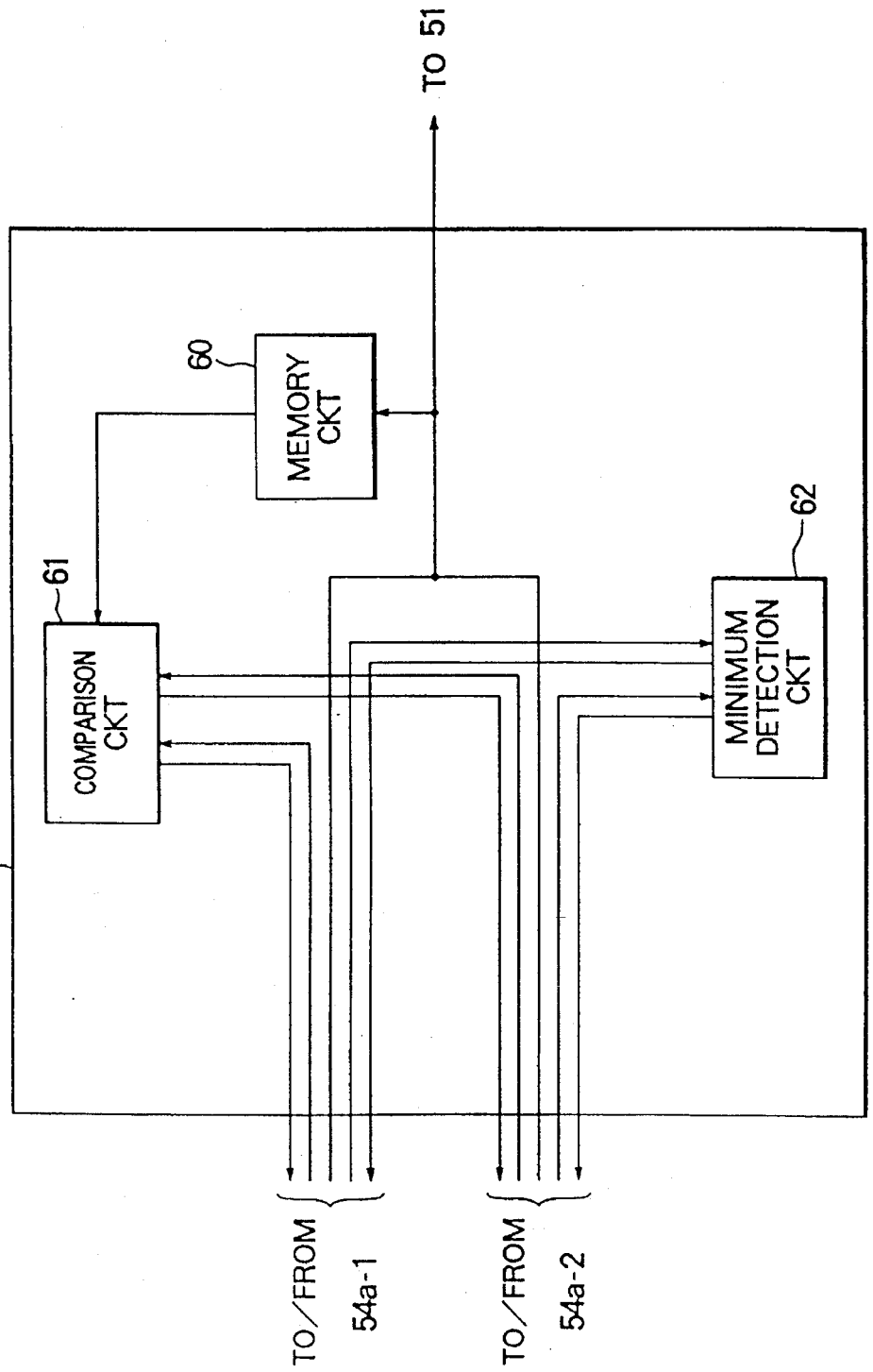
FIG. 19 is a block diagram of a tertiary switch for use in the packet switching system illustrated in FIG. 17.

Turning to FIG. 19, the tertiary switch 55a (suffixes omitted) is similar-in structure and operation to that illustrated in FIG. 14 except that the first and the second packet memories 59-1 and 59-2 are omitted. The comparison circuit 61 and the minimum detection circuit 62 are directly connected to the first and the second packet memories 58a-1 and 58a-2 in the secondary switch 54a (FIG. 18).

In the tertiary switch 55a, the memory circuit 60 and the comparison circuit 61 may be omitted.

As is apparent from the above-mentioned description in conjunction with FIGS. 17, 18, and 19, it is possible to commonly use the packet memories for the secondary switch and the packet memories for the tertiary switch. It is therefore possible to effectively use all of the packet memories. It may be possible to commonly use a common memory as the packet memories corresponding to the output ports. Use of such a common memory is extremely effective.

While this invention has thus far been described in conjunction with a few embodiments thereof, it will now be readily possible for those skilled in the art to put this invention into practice in various other manners.

What is claimed is:

1. A packet switching system which is composed of a 3-stage switch network and which has first through N-th input ports and first through N-th output ports, where N represents a predetermined integer which is not less than two, each of said first through said N-th input ports being supplied with an input packet having a fixed-length while said first through said N-th output ports produce first through N-th output packets, respectively, each of which has said fixed-length, said input packet consisting of a header and information bits, the header of said input packet including a destination address indicative of destination for said input packet in question, said packet switching system comprising:

first through N-th time stampers connected to said first through said N-th input ports, respectively, each of said first through said N-th time stampers assigning a time stamp indicative of a time instant to said input packet to produce a time stamped packet;

first through N-th primary switches connected to said first through N-th time stampers, respectively, each of said first through said N-th primary switches having a primary input line and first through N-th primary output lines, each of said first through said N-th primary switches carrying out a primary switching operation on said time stamped packet so as to selectively connect said primary input line with said first through said N-th primary output lines to produce primary switched packets;

first through N-th secondary switches connected to said first through N-th primary switches in a cross link connection fashion, each of said first through N-th secondary switches having first through N-th secondary input lines and first through N-th secondary output lines, the n-th secondary input line of each said first through said N-th secondary switches being connected to said first through said N-th primary output lines of an n-th primary switch, respectively, where n represents an integer varying between one and N, both inclusive, each of said first through N-th secondary switches carrying out a secondary switching operation on said primary switched packets supplied thereto in sequence on the basis of said destination addresses included in the respective primary switched packets to produce secondary switched packets; and first through N-th tertiary switches connected to said first through N-th secondary switches in the cross link connection fashion, each of said first through said N-th tertiary switches having first through N-th tertiary input lines and a tertiary output line, the n-th tertiary input line of each said first through said N-th tertiary switches being connected to said first through said N-th secondary output lines of an n-th secondary switch, respectively, each of said first through N-th tertiary switches carrying out a tertiary switching operation on the secondary switched packets successively supplied thereto on the basis of the time stamps assigned to the respective secondary switched packets, said first through said N-th tertiary switches producing first through N-th tertiary switched packets, respectively, the tertiary output lines of said first through N-th tertiary switches being connected to said first through said N-th output ports, respectively, whereby said first through said N-th output ports produce, as said first through N-th output packets, said first through said N-th tertiary switched packets, respectively.

2. A packet switching system as claimed in claim 1, wherein each of said first through said N-th primary switches is a distributor for distributing said time stamped packets successively supplied thereto to different single ones of said first through said N-th primary output lines to produce distributed packets as said primary switched packets.

3. A packet switching system as claimed in claim 1, wherein said first through said N-th tertiary switches are first through N-th sequence correctors for correcting sequence of said secondary switched packets successively supplied thereto to produce first through N-th sequence corrected packets as said first through said N-th tertiary switched packets, respectively.

4. A packet switching system as claimed in claim 1, wherein an n-th tertiary switch comprises:

first through N-th packet memories connected to said first through said N-th tertiary input lines, respectively, and to said tertiary output line in common for storing said secondary switched packets supplied thereto as first through N-th stored packets, respectively; and a minimum detection circuit connected to said first through said N-th packet memories for checking whether or not any packet is stored in said first through said N-th packet memories and for receiving, as lead time stamps, said time stamps assigned to the lead packets in said first through said N-th packet memories, said minimum detection circuit comparing said lead time stamps with one another when each of said first through said N-th packet memories has a stored packet, said minimum detection circuit selecting one of said lead time stamps that is the least time stamp indicating the least time instant among said time instants thereof to deliver a sending allowable signal to one of said first through said N-th packet memories so as to output a packet having said one of the lead time stamps as an n-th tertiary switched packet.

5. A packet switching system as claimed in claim 1 wherein an n-th tertiary switch comprises:

first through N-th packet memories connected to said first through said N-th tertiary input lines, respectively, and to said tertiary output line in common for storing said secondary switched packets supplied thereto as first through N-th stored packets, respectively;

a memory circuit connected to said first through said N-th packet memories for storing, as a stored time stamp, the time stamp assigned to the last outputted packet supplied from any one of said first through said N-th packet memories;

a comparison circuit connected to said memory circuit and said first through said N-th packet memories for receiving, as lead time stamps, said time stamps assigned to the lead packets in said first through said N-th packet memories and for comparing said stored time stamp with each of said lead time stamps, said comparison circuit delivering a sending allowable signal to one of said first through said N-th packet memories when said stored time stamp coincides with at least one of said lead time stamps thereby making said one of said first through said N-th packet memories output the packet having a lead time stamp that coincides with said stored time stamp; and a minimum detection circuit connected to said first through said N-th packet memories for checking whether or not any packet is stored in said first through said N-th packet memories and for comparing said lead time stamps with one another when each of said first through said N-th packet memories has a stored packet, said minimum detection circuit selecting one of said lead time stamps that is the least time stamp indicating the least time instant among said time instants thereof to deliver another sending allowable signal to one of said first through said N-th packet memories so as to output a packet having said one of the lead time stamps as said last outputted packet.

6. A packet switching system as claimed in claim 1, wherein an n-th tertiary switch comprises:

first through N-th time stamp separators connected to said first through N-th tertiary input lines, respectively, for separating the time stamps from said secondary switched packets supplied thereto to produce first through N-th separated time stamps, respectively;

a multiplexing circuit connected to said first through said N-th time stamp separators for multiplexing said secondary switched packets supplied via said first through said N-th time stamp separators into a multiplexed packet;

a packet memory having a control terminal and connected to said multiplexing circuit and said tertiary output line for storing said multiplexed packet as a stored packet;

a memory control circuit connected to said control terminal for generating a write-in address for said packet memory;

first through N-th time stamp memories connected to said memory control circuit and said first through said N-th time stamp separators, respectively, for storing, as first through N-th stored time stamps and a stored address, said first through said N-th separated time stamps, respectively, together with said write-in address; and a minimum detection circuit connected to said first through said N-th time stamp memories, said memory control circuit, and said packet memory for comparing lead time stamps in said first through N-th stored time stamps with one another to detect the least time stamp among said lead time stamps, said minimum detection circuit delivering, as a read-out address, to said packet memory the write-in address which corresponds to said least time stamp to make said packet memory produce a packet having the least time stamp as an n-th tertiary switched packet, said minimum detection circuit sending said read-out address to said memory control circuit as an empty address for said packet memory.

7. A packet switching system as claimed in claim 1, wherein an n-th tertiary switch comprises:

first through N-th time stamp separators connected to said first through N-th tertiary input lines, respectively, for separating the time stamps from said secondary switched packets supplied thereto to produce first through N-th separated time stamps, respectively;

a multiplexing circuit connected to said first through said Nth time stamp separators for multiplexing said secondary switched packets supplied via said first through said N-th time stamp separators into a multiplexed packet;

a packet memory having a control terminal and connected to said multiplexing circuit and said tertiary output line for storing said multiplexed packet as a stored packet;

a memory circuit connected to said packet memory for storing, as a last stored time stamp, the time stamp assigned to the last outputted multiplexed packet supplied from said packet memory;

a memory control circuit connected to said control terminal for generating a write-in address for said packet memory;

first through N-th time stamp memories connected to said memory control circuit and said first through said N-th time stamp separators, respectively, for storing, as first through N-th stored time stamps and a stored address, said first through said N-th separated time stamps, respectively, together with said write-in address;

a minimum detection circuit connected to said first through said N-th time stamp memories, said memory control circuit, and said packet memory for comparing lead time stamps in first through said N-th stored time stamps with one another to detect the least time stamp among said lead time stamps, said minimum detection circuit delivering, as a read-out address, to said packet memory the write-in address which corresponds to said least time stamp to make said packet memory produce a packet having the least time stamp as said last outputted packet, said minimum detection circuit sending said read-out address to said memory control circuit as an empty address for said packet memory; and a comparison circuit connected to said memory circuit, said first through said N-th time stamp memories, said memory control circuit, and said packet memory for comparing said last stored time stamp with each of said lead time stamps to detect the least time stamp in said lead time stamps that coincides with said last stored time stamp, said comparison circuit delivering, as said read-out address, to said packet memory, the write-in address which corresponds to the least time stamp to make said packet memory produce the packet having a lead time stamp that coincides with said last stored time stamp, said comparison circuit sending said read-out address to said memory control circuit as said empty address for said packet memory.

8. A packet switching system as claimed in claim 1, wherein each of said first through said N-th secondary switch comprises:

a time division bus connected to said first through said N-th secondary input lines for carrying out a time division multiplexing operation on said primary switched packets to produce time division multiplexed packets;

first through N-th address filters connected to said time division bus for preliminarily memorizing, as first through N-th memorized addresses, first through N-th output line addresses of said first through said N-th secondary output lines, respectively, said first through N-th address filters detecting whether or not said first through N-th memorized addresses coincide with said destination address in the header of each of said time division multiplexed packets to receive, as first through N-th received packets, ones of said time division multiplexed packets that have the destination addresses coincident with said first through said N-th memorized addresses; respectively; and first through N-th packet memories connected to said first through N-th address filters and said first through said N-th secondary output lines, respectively, for storing said first through said N-th received packets as first through N-th stored packets, respectively.

9. A packet switching system as claimed in claim 8, wherein an n-th tertiary switch comprises a minimum detection circuit connected to said first through said N-th packet memories for checking whether or not any packet is stored in said first through said N-th packet memories and for receiving, as lead time stamps, said time stamps assigned to the lead packets in said first through said N-th packet memories, said minimum detection circuit comparing said lead time stamps with one another when each of said first through said N-th packet memories has a stored packet, said minimum detection circuit selecting one of said lead time stamps that is the least time stamp indicating the least time instant among said time instants thereof to deliver a sending allowable signal to one of said first through said N-th packet memories so as to output a packet having said one of the lead time stamps as an n-th tertiary switched packet.

10. A packet switching system as claimed in claim 8, wherein an n-th tertiary switch comprises:

a memory circuit connected to said first through said N-th packet memories for storing, as a stored time stamp, the time stamp assigned to the last outputted packet supplied from any one of said first through said N-th packet memories;

a comparison circuit connected to said memory circuit and said first through said N-th packet memories for receiving, as lead time stamps, said time stamps assigned to the lead packets in said first through said N-th packet memories and for comparing said stored time stamp with each of said lead time stamps, said comparison circuit delivering a sending allowable signal to one of said first through said N-th packet memories when said stored time stamp coincides with at least one of said lead time stamps thereby making said one of said first through said N-th packet memories output a stored packet having said one of said lead time stamps that coincides with said stored time stamp; and a minimum detection circuit connected to said first through said N-th packet memories for checking whether or not each of said first through said N-th packet memories has a stored packet, and for comparing said lead time stamps with one another when any packet is stored in all of said first through said N-th packet memories, said minimum detection circuit selecting one of said lead time stamps that is the least time stamp indicating the least time instant among said time instants thereof to deliver another sending allowable signal to one of said first through said N-th packet memories so as to output a packet having said one of the lead time stamps as said last outputted packet.

11. A packet switching system as claimed in claim 1, wherein each of said first through said N-th secondary switches is supplied with said primary switched packet and produces said secondary switched packets, of said first through said N-th secondary switches having an input rate, and having an output rate equal to m times said input rate, where m represents a positive integer which is not greater than said predetermined integer.

* * * * *